United States Patent [19]
Kawai

[11] Patent Number: 5,822,529
[45] Date of Patent: Oct. 13, 1998

[54] DISTRIBUTED BIDIRECTIONAL COMMUNICATION NETWORK STRUCTURE IN WHICH A HOST STATION CONNECTED TO A PLURALITY OF USER STATIONS INITIALLY ASSISTS ONLY IN SETTING UP COMMUNICATION DIRECTLY BETWEEN USER STATIONS WITHOUT GOING THROUGH THE HOST STATION

[76] Inventor: Shosaku Kawai, 1-10-3-1304,Shinkitano, Yodogawa-ku,Osaka-shi, Osaka 530, Japan

[21] Appl. No.: 512,707

[22] Filed: Aug. 8, 1995

[30] Foreign Application Priority Data

Aug. 11, 1994 [JP] Japan .................................. 6-189708
Apr. 11, 1995 [JP] Japan .................................. 7-085028

[51] Int. Cl.$^6$ .............................. H04M 3/42; H04M 1/66
[52] U.S. Cl. .............................. 395/200.49; 395/200.31; 395/615; 379/202
[58] Field of Search .................................. 395/606, 610, 395/615, 329, 200.02, 200.49, 200.12, 200.31; 379/202

[56] References Cited

U.S. PATENT DOCUMENTS 5,117,458  5/1992  Takaragi et al. .............................. 380/4
5,239,577  8/1993  Bates et al. .............................. 379/201
5,539,813  7/1996  Jonsson .................................. 379/202

OTHER PUBLICATIONS

"A Service Platform for Distributed Applications", Popescu–Zeletin et al, IEEE, pp. 11–17, Jul. 1992.

*Primary Examiner*—Dinh C. Dung
*Assistant Examiner*—Rehana Perveen
*Attorney, Agent, or Firm*—Armstrong, Westerman, Hattori, McLeland & Naughton

[57] ABSTRACT

In a communication network structure, a communication network system using the communication network structure and a communication method for the communication network system, a plurality of user stations which are connected to one another through bidirectional communication means, and at least one host station which is connected to each of the user stations through bidirectional communication means. The host station holds a data base containing consciousness information in which only each user station's intention of entering the communication network is collected, and communication connection in formation which is required for each user station to directly or indirectly select another user station without going through host station to perform a direct communication therebetween, and each user station holds knowledge information to be delivered between the user stations without going through the host station by the direct communication therebetween.

20 Claims, 22 Drawing Sheets

(Fig. 22)
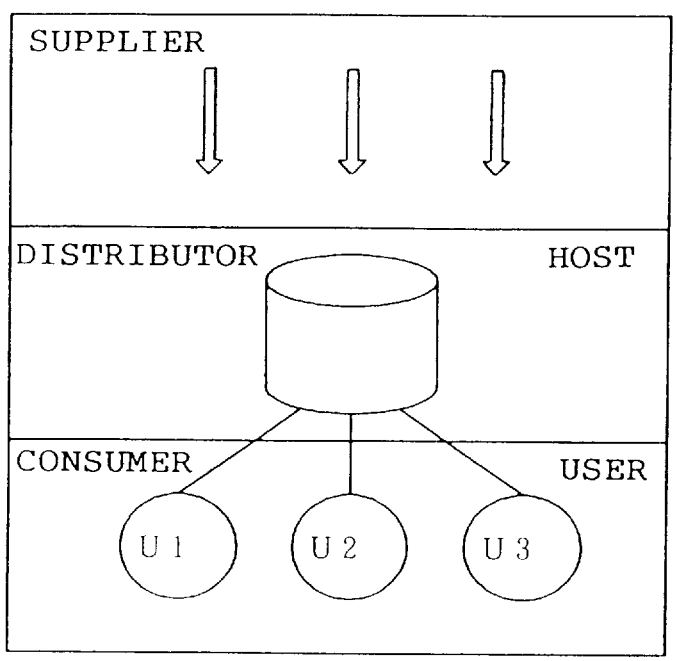

DISTRIBUTED BIDIRECTIONAL COMMUNICATION NETWORK STRUCTURE IN WHICH A HOST STATION CONNECTED TO A PLURALITY OF USER STATIONS INITIALLY ASSISTS ONLY IN SETTING UP COMMUNICATION DIRECTLY BETWEEN USER STATIONS WITHOUT GOING THROUGH THE HOST STATION

BACKGROUND OF THE INVENTION

1. Field of the Invention

The present invention relates to a communication network structure with which the relationship between a host station and each host station is drastically improved. Furthermore, the present invention relates to a communication network system to which the communication network structure is applied, and more particularly to a communication network system which can organically treat video information, audio information, information relating to characters, etc., and with which an user can take the initiative in operation of a network. Still further, the present invention relates to a communication method for the communication network system.

2. Description of Related Art

There have been utilized various communication network systems in which personal computers scatteringly locating at all parts of the country are connected to a host machine through a communication line. FIG. 20 schematically shows a conventional communication network system. As shown in FIG. 20, the conventional communication system is designed so that many user stations U1, U2 are connected to ends of a communication network which is radially constructed (extended) with a host station H1 at the center thereof. Specifically, in order to reduce the difference in communication expenses due to the difference between a long-distance communication and a short-distance communication, the communication system is designed so that an access point H2 is disposed at each district (e.g., Osaka) as shown in FIG. 21, and each of user stations U21 to U26 is indirectly connected to the host station through the access point H2. In this communication network system, each user can directly or indirectly access the host station, so that he can transmit an electronic computer originated mail to another user by using various data bases or temporarily storing information in a mail box of a host machine at the host station.

In this type of communication network system, all communications are performed through a machine disposed at the host station (hereinafter referred to as "host machine"), so that each user station can transmit an electronic computer originated mail or use a data base by merely conforming to a communication protocol with the host machine. Therefore, this network system has an advantage that each user is not required to consider conformity with a communication protocol of another user station machine. However, this network system has the following problems, and these problems have become increasingly more serious.

(1) Information is necessarily stored in the host machine, and thus an enormous amount of information is stored in the host machine. As the number of user stations increases, the host machine must be designed in large scale. In addition, image data and audio data have been recently treated in the network communication, so that the data size tends to increase. In order to follow this tendency, the host machine must be unceasingly and indispensably renewed and designed to be gigantic, so that an enormous cost is required for maintenance of the host computer. This maintenance cost is necessarily collected as communication expenses from network members. Accordingly, an increasing load is finally imposed on each user.

(2) Since all information is necessarily temporarily stored in the host machine or transmitted through the host machine, treatment and arrangement of electronic computer originated mails, classification of data stored in a data base and a structuring method of a data base are necessarily effected by an intention of an operation manager of the host machine even when the operation manager aims at a neutral operation management, so that the information is controlled by the operation manager. For example, in an on-line shopping case, this means that those articles which are out of standards and thus do not meet a mass sale may be excluded.

(3) All data are temporarily stored in the host machine, and then these data are distributed through the host machine as a starting point, so that the operation manager of the host machine tends to serve as an information distributor. Therefore, when an information communication route is selected by the operation manager, he is liable to select a route in which adjusted information can be collectively obtained because of a characteristic as an information distributor (information distribution service), so that a three-layered structure as shown in FIG. 22 is formed for information communication flow (route). That is, information suppliers as a minority are located at the upstream of the flow (route), information consumers (users) as a majority are located at the downstream side of the flow (route) and the host station as an information distribution service is located at the center of the flow (route) (between the suppliers and the consumers) as shown in FIG. 22. In this structure, the relationship between the information suppliers and the information consumers (users) is fixed, and thus the network system itself is not advanced. The above tendency of the communication network has been increasingly remarkable, and it is more remarkable particularly for big communication networks.

The above problems are inherent in the personal computer communication. However, these problems occur not only in the personal computer communication, but also in other communication network systems each of which contains a host machine. Accordingly, these problems are expected to be serious in various communication network systems which will be developed in the future.

SUMMARY OF THE INVENTION

A first object of the present invention is to provide a communication network structure in which the relationship between a host station and a user station is drastically improved to be changed from a host initiative (master) type to an user initiative (master) type.

A second object of the present invention is to provide a communication network system and a communication method therefor which can readily meet the increase in communication information amount in the future with no problem and no uneasiness.

The inventor of this application has engaged himself in studies on the problems which are inherent to the conventional communication network structure, and has concluded that the most critical problem of the conventional communication network resides in that all information is stocked in a host station. The stock of all the information in the host station means that all the information is under the control of a manager for the host station, and this may cause an obstruction of free information delivery between user stations. In addition, the stock of the information in the host station causes an enormous increase in the size of the host station machine.

In order to avoid such a situation, the relationship between the host station and the user station is required to be drastically improved, and information to be stocked in the host station must be first considered to meet the above requirement. From this viewpoint, the inventor has considered the "information", and he has the following recognition through the consideration.

Materials which are collectively called as "information" and "data" in the conventional communication network system are actually not homogeneous in content, and the "information" is discriminated into "consciousness information" and "knowledge information" in accordance with its content. In this case, "consciousness", "knowledge", "information", "consciousness information" and "knowledge information" must be treated while being conceptually discriminated from each other. These words are defined as follows:

"consciousness":
  (1) the mind of a living body which is awake during an event, a situation, etc., and is able to understand what is happening.
  (2) all spiritual things of a living body, which contain thought, perception, intention, instinct, etc.

"knowledge":
  (1) what a living body knows on matters.
  (2) what a living body understands and recognizes on matters.

"information":
  (1) something which gives knowledge on matters, events, things, etc.
  (2) all things like materials and data which are useful to make a proper judgment or make a decision of an action to achieve a specific object.

"consciousness information": all things which give knowledge on the contents of "consciousness", materials and data on the contents of "consciousness".

"knowledge information": all things which give knowledge on the contents of "knowledge", materials and data on the contents of "knowledge".

By classifying the information into the "consciousness information" and the "knowledge information" as described above, the characteristic of the conventional communication network structure is made clearer. For example, when a person A takes into his head "to know how to make a delicious salad" and thus he wants to obtain information (response) on this on a communication network, the person A can utilize the following two methods to obtain the response in the conventional communication network structure. One method is applied to a case where the response on this theme has been already stored in the host station, and the other method is applied to a case where the response is not stored in the host station and thus it must be obtained from another user station as an advice. There are two cases for the response which is prepared in the host station. One case is that the manager of the host station beforehand prepares responses for themes whose access frequency is high, and the other case is that it is extracted from an argument or the like for the same theme which was previously made by a network member. For example, "specific combinations of vegetables, specific mixtures of dressings" are provided as a response.

In this case, a mind "to know how to make a delicious salad" corresponds to consciousness information, and a response "specific combinations of vegetables and specific mixtures of dressings" for the mind corresponds to knowledge information. In both the cases where the response "specific combinations of vegetables and specific mixtures of dressings" is beforehand registered in the host station and where a response is obtained from another user station, in the conventional communication network structure, this knowledge information is transmitted through the host station and temporarily stocked in the host machine. The stock of the knowledge information in the host machine means that the knowledge information is under the control of the manager of the host station as described above, and thus it causes the host machine to be enormous in size.

The inventor of this application is convinced that the problem of the conventional communication network structure can be solved by registering only the consciousness information in the host machine without stocking the knowledge information in the host machine, and stocking the knowledge information in the user station. On the basis of the above viewpoint, a communication network structure according to the present invention has been achieved.

That is, the communication network structure according to the present invention (claim 1) comprises several user stations which are connected to one another through bidirectional communication means, and at least one host station which is connected to each of the user stations through bidirectional communication means, wherein the host station holds a data base containing consciousness information in which only each user-station's intention of entering the communication network is collected, and communication connection information which is required for each user station to directly or indirectly select another user station through no host station to perform a direct communication therebetween, and wherein each user station holds knowledge information to be delivered between the user stations through no host station by the direct communication therebetween. Wire communication, wireless communication or the combination communication of the wire communication and the wireless communication may be used as the communication means.

A public line or an exclusive line may be used as a line for the wire communication. As the public line may be used a well-known line such as ISDN line, analog telephone line, or the like. A fixed telephone line, a portable wireless telephone line, a personal handy phone line or the like may be used as a telephone line used for the public line, Amateur wireless or business wireless may be used as the wireless communication. Furthermore, one or both of the consciousness information registered in the host station and the knowledge information stocked in each user station may contain video information.

A general problem of the conventional communication network as described above is more clarified by making a concentrated consideration on a personal computer communication, and a countermeasure to the problem is also clearer.

As described above, the large scale of the host machine of the conventional communication network system is caused by the fact that all data are temporarily stored in a storage medium of the host machine when user stations communicate with each other. In order to avoid this, only the required and minimum amount of data are registered in the host machine, and detailed data are allowed to be mutually and directly communicated between user stations.

In this case, consciousness information which is the summary of user's intention contents and required to be transmitted to another user corresponds to data which are required to be registered in the host machine. Accordingly, the host machine should offer only a group of such consciousness information to public perusal (reading), and it should be engaged to supply only a "field" where other users who can respond to the consciousness information are gathered.

Hitherto, the host station serves as a buffer for compensating for the difference in communication protocol between user machines. However, the communication protocols have been recently unified into one communication protocol, and the problem of the difference in communication protocol can be perfectly solved by standardizing the user machines. Therefore, there is no large obstruction to the direct communication between the user stations at present.

A communication network system according to the present invention which has been implemented on the basis of the above viewpoint, includes several user stations which are connected to one another through bidirectional communication means and at least one host station which is connected to each of the user stations through bidirectional communication means, and is characterized in that a user machine disposed at each user station and a host machine disposed at the host station are constructed as follows.

The user machine at the user station has the following functional means.

(1) consciousness information input means for representing the user's consciousness information, which is the summary of the user's consciousness to be transmitted to another user, with one type or a combination of several types which are selected from the group consisting of picture, voice, sound, music, characters, symbols and numerals in a limited range of total information amount, and inputting the consciousness information according to a frame indication;

(2) consciousness information registering means for registering the consciousness information input from the consciousness information input means in a consciousness data base which is offered to public reading (perusal) under the control of the host station;

(3) consciousness information reading means for reading consciousness information of other users which are registered in the consciousness data base;

(4) response intention registering means for expressing an intention of directly communicating with another user who registers consciousness information to which the user concerned can respond (a user who is a dialogue person with the user concerned is hereinafter referred to as "target user"), through the network to the host station when the user finds out the consciousness information in the consciousness data base being read, and registering a response intention into the host machine;

(5) communication connection information recording means for receiving communication connection information on a target user, which is transmitted to a user who is judged to be proper by the host station in response to the expression of the response intention, and storing the communication connection information in a recording medium;

(6) target user automatic dialing means for connecting a bidirectional communication path with a user machine of the target user on the basis of the communication connection information stored in the communication connection information recording means; and (7) knowledge information transmission and reception means for representing the detailed knowledge to be transmitted through the line-connected communication path with one type or a combination of several types which are selected from picture, voice, sound, music, characters, symbols and numerals, and communicating the knowledge information with the target user. The host machine at the host station has the following functional means.

(8) consciousness information open-public means for arranging various consciousness information of each user which is registered in the consciousness data base and opening to the public the consciousness information group through the network to all or specific users;

(9) correspondence intention link means for performing a matching between consciousness information registered in the consciousness data base and the response intention content to string or group both consciousness information and response intention between which a high corresponding relationship is satisfied; and

(10) communication connection information supply means for informing at least one of a user registering the consciousness information and a user registering the response intention of a matching success when the matching succeeds, and supplying through the network the communication connection information to be directly communicated with the target user (the user at the other side).

The concept of the "target user" used in the above description means a user who is a dialogue target, and it is defined in terms of an user who wants to have a dialogue with the dialogue target. Therefore, the relationship between the user and the target user is merely relative.

Usually, the mutual communication between user stations and the communication between each user station and the host station are alternatively selected except for specific cases.

In the communication network system as described above, the manner of deciding a dialogue target and communicating with the dialogue target comprises the means for notifying the host machine of an intention of responding consciousness information which interests a user (can be responded by the user) when the user finds the interesting consciousness information (response intention registering means), the means for conducting a matching operation on the consciousness information and the response intention content in the host machine (correspondence intention link means), and the means for informing the user of a matching success and supplying the communication connection information on a target user (communication connection information supply means). However, another manner may be used as the manner of deciding the dialogue target and communicating with the dialogue target. For example, when consciousness information to which the user can respond is found by the user on the basis of a list of consciousness information group with no matching operation by the host machine, the user may ask the host station to supply the communication connection information to directly communicate with a target user (dialogue target). Furthermore, the matching operation may be carried out by the host machine on the assumption that a necessary combination is selected in strict consideration of conformity (consistency) of a theme, or that an incidental combination is selected in moderate consideration of conformity of a theme to realize an unexpected encounter.

Because the user machine disposed at the user station may be used an user machine having an operation device, a display device, a storage device, a large-capacity storing medium, a communication device and a consciousness information input means. The consciousness information input means may be constructed by at least one of an image input device, an audio input device and a character input device, or a combination thereof. The user station is functionally equipped with a personal computer function, a telephone function and a television receiver function.

With respect to the communication protocol, when respective user stations use different communication protocols from one another, a pre-adjustment work is required for the line connection. Accordingly, it is preferable that the communication protocol is unified among the user stations.

A current analog line may be used as a communication network for connecting the user stations to each other and for connecting each user station to the host station. However, an ISDN line in which digital transmission is mainly used is preferably used from the viewpoint that a large-capacity of data can be transmitted at a high speed and a transmitter number function notification, etc. can be practically used.

The communication method which is used in the communication network system thus constructed comprises the following steps:

(A) a consciousness information registering step of representing user's consciousness information, which is the summary of user's consciousness to be transmitted to another user, with one type or a combination of several types which are selected from the group consisting of picture, voice, sound, music, characters, symbols and numerals in a limited range of total information amount, and transmitting the consciousness information to the host station by operating an user machine and registering the consciousness information in a consciousness data base which is managed by the host station;

(B) a consciousness information open-public step of arranging various consciousness information of respective users which are registered in the consciousness data base and opening to the public these consciousness information to all the users or specific users through a network by the host station;

(C) a consciousness information reading step of accessing the consciousness data base through an operation of a user machine by a user to read consciousness information of other users which are registered in the consciousness data base;

(D) a response intention registering step of expressing an intention of directly communicating with another user who registers consciousness information to which the user concerned can respond, through the network to the host station when the user finds the consciousness information in the read consciousness data base, and registering the response intention into the host machine;

(E) a correspondence intention link step of performing a matching operation between consciousness information registered in the consciousness data base and the response intention content by the host station to string or group both consciousness information and response intention between which high corresponding relationship is satisfied;

(F) a communication connection information supply means for informing at least one of a user registering the consciousness information and a user registering the response intention of a matching success when an intention link succeeds in the correspondence intention link process, and supplying the communication connection information from the host station through the network to directly communicated with a user at the other user who is a target user; and (G) an inter-user communication step of setting a bidirectional communication path with a user machine of the target user to a line connection state in accordance with the communication connection information obtained from the host station in the communication connection information supply step by operating the user machine, and representing detailed knowledge to be transmitted between both the users through the line-connected communication path with one type or a combination of several types which are selected from the group consisting of picture, voice, sound, music, characters, symbols and numerals, thereby mutually transmitting the knowledge information by operating the user machines.

In the steps of D, E and F, the decision of the dialogue target is performed through the matching work of the host machine. On the other hand, the decision of the dialogue target may be dependent on an user's selection through his reading (perusal) of a list of consciousness information group without using the matching work of the host machine. In this case, in place of the steps of D, E and F, the following steps of D' and E' may be used.

(D') A communication connection information request step of requesting to the host station communication connection information to directly communicate with a target user who registers consciousness information to which the user can respond when the user finds the consciousness information in the consciousness data base being read; and (E') a communication connection information supply step of notifying the communication connection information on the target user from the host station through the network to the user in response to the communication connection information request on the target user which is made by the user.

It is preferable to keep secrete a telephone number of a target out of communication connection information of the target user which is supplied from the host station to an user. It may be used as a secrete manner that the telephone number is not displayed and kept to an invisible state, or that the telephone number is coded and it is made meaningful or decoded in an user untouchable area in the user machine.

Various methods may be considered to register consciousness information in the consciousness data base. For example, a multiple choice questionnaire system of selecting one from response matters prepared for question matters which are before prepared is adopted, and the content of consciousness information to be registered is represented by an assembly of codes or numeral values which are selected in correspondence to each question matter. In this case, the content of the consciousness information can be easily analyzed and estimated. Such a questionnaire is preferably designed in a tree structure.

Furthermore, various methods may be considered as the registering method of the response intention content in the response intention registering step. In this case, the multiple choice questionnaire system is also preferably used from the viewpoint of the easiness of the analysis and the estimation like the registering method of the consciousness information into the consciousness data base.

Both of each consciousness information registered in the consciousness data base and the response intention content registered in the response intention registering step can be registered in a text document format. In this case, the matching work of the host machine is executed after the consciousness information and the response intention content are analyzed and classified with preset classification key words as indices.

In the matching work of the host station, it is preferable that a target user having the closest corresponding relationship with the user is set as a first candidate, and other target users are also ranked as subsequent candidates in accordance with the closeness degree in the corresponding relationship to prepare preliminary candidates in consideration of the possibility that the dialogue with the first candidate is unestablished. On the other hand, the matching work may be carried out in consideration of a contingency factor without using the closeness degree of the corresponding relationship as an index.

In the communication network structure, each user registers in the host machine short consciousness information which is the summary of his consciousness to be transmitted, such as a request, an inquiry or the like to another user while he stores a large amount of knowledge information into a user machine which is managed on each user's own responsibility. The host station serves as a "public square" to allow one user to encounter another user, and users who encounter each other on the host machine separate from the host station, and directly communicate knowledge information therebetween. Such a communication network structure is applicable to not only the personal computer communication, but also all communication networks insofar as they have a host station, and any means may be suitably selected as the communication means in accordance with the characteristic of an used network.

In a communication network system in which the communication network structure as described above is applied to a personal computer network, the consciousness information is registered in the consciousness data base which is constructed on the host machine.

The registering method of the consciousness information may be a questionnaire method in which the host machine successively responds to inquiries, a method of describing a content which is required to be directly transmitted in the text document format, or a method of inputting the information with various types of input equipment. The consciousness information is represented by one type or a combination of several types which are selected from picture, voice, sound, music, characters, symbols and numerals, and it is important to limit the total information amount thereof to a small size.

The consciousness information registered in the consciousness data base are opened to all users or specific users in the form of a list, and a user accesses to the consciousness data base to freely read the content of the consciousness information. In this case, only the consciousness information can be read, and the communication connection information such as telephone numbers of registers of the consciousness information are kept secret.

As a result of the reading, when he finds the consciousness information to which the user can respond, he notifies the host machine that he can respond to the consciousness information, thereby obtaining the communication connection information on a target user who is a dialogue target.

The following two processes may be mainly used from the step of notifying the response intention to the host machine to the step of obtaining the communication connection information on the target user. A first process is performed through a matching work of the host machine, and a second process is performed with no matching work.

According to the first process, when several response intentions are registered in the host machine for consciousness information which are registered in the consciousness data base, the host machine compares the consciousness information with the content of the several response intentions given to the consciousness information to specify a response intention having a content which most closely meets the content of the consciousness information and determine an user registering this response intention as a dialogue target (target user). In addition, communication connection information to directly communicate with the target user is notified to a user who first registers the consciousness information. The matching method is based on an operation in which the consciousness information and the response intention are linked to each other on the basis of the closeness degree in their contents. However, another matching method using an operation of linking the consciousness information and the response intention on the basis on a casual encounter may be used.

According to the second process, a user who finds consciousness information to which the user can respond, notifies his response intention to the host machine, and at the same time he requests the host machine to supply the communication connection information on an user serving as a dialogue target (target user). In response to this request, the host machine successively supplies the communication connection information on the dialogue target to users in order of registration time with no examination or a simple examination and substantially without matching operation of the host machine.

After the communication connection information on the dialogue target is obtained, the users close their communication networks with the host machine, and set a communication network therebetween to a line-connection state, whereby the users can directly communicate the knowledge information therebetween through no host machine. No restriction is imposed on the total information amount for the communication, and they can communicate a large amount of knowledge information which is represented by one type or a combination of several types which are selected from picture, voice, sound, music, characters, symbols and numerals.

As described above, according to the present invention, the host machine basically serves as only a "field" for assisting users to encounter one another. Therefore, after the encounter, the users separate from the host machine and directly communicate with each other. Accordingly, the information registered in the host machine can be limited to necessary minimum consciousness information, and the storage data amount can be prevented from being enormous, and the operation of the system can be continued with a small-scale host machine.

Since the direct communication between the users corresponds to delivery of the details of desired knowledge information therebetween, no problem occurs because these data are managed on the user's own responsibility and also managed in the user machine which is managed by the user himself, although the amount of data to be treated is large.

In the direct communication between users is transmitted information which is represented by one type or a combination of plural types which are selected from picture, voice, sound, music, characters, symbols and numerals. Therefore, as a user machine may be used with a multi-media equipment which is equipped with an image input image, an audio input device, a character input device, etc., and has a personal computer function, a telephone function, a television receiving function, etc.

In this system, if the communication protocols of the user machine as described above are unified into one protocol among all the user machines, no pre-adjustment is required for the direct communication between users (hereinafter referred to as "inter-use communication").

If a network through which user stations are mutually connected to each other and each user station is connected to the host station is a ISDN line, a calling station is specified in the inter-use communication, and thus a communication rejecting right is secured. Furthermore, in the ISDN line, the difference in communication expenses between a long-distance communication and a short-distance communication is small, so that no problem occurs in cost for a communication which is performed between users who live far away from each other.

Furthermore, by checking conformity between an user ID number and a notified number of a calling person, it is confirmed whether the calling station is an actual user. Therefore, a credit inquiry and a settlement of accounts for on-line shopping can be made without error.

Still furthermore, when a telephone number of the communication connection information on a target user which is supplied from the host station to an user is kept secrete to the user, the user machine automatically dials the target user without notifying the telephone number to the user. Accordingly, the user cannot know the telephone number of the target user unless he is told about the telephone number, and thus the possibility that user's privacy is invaded can be reduced.

BRIEF DESCRIPTION OF THE DRAWINGS

FIG. 22 is a diagram showing a problem which is inherent to the conventional communication network system.

DETAILED DESCRIPTION OF THE PREFERRED EMBODIMENTS

Preferred embodiments according to the present invention will be described hereunder with reference to the accompanying drawings.

Figure 1:
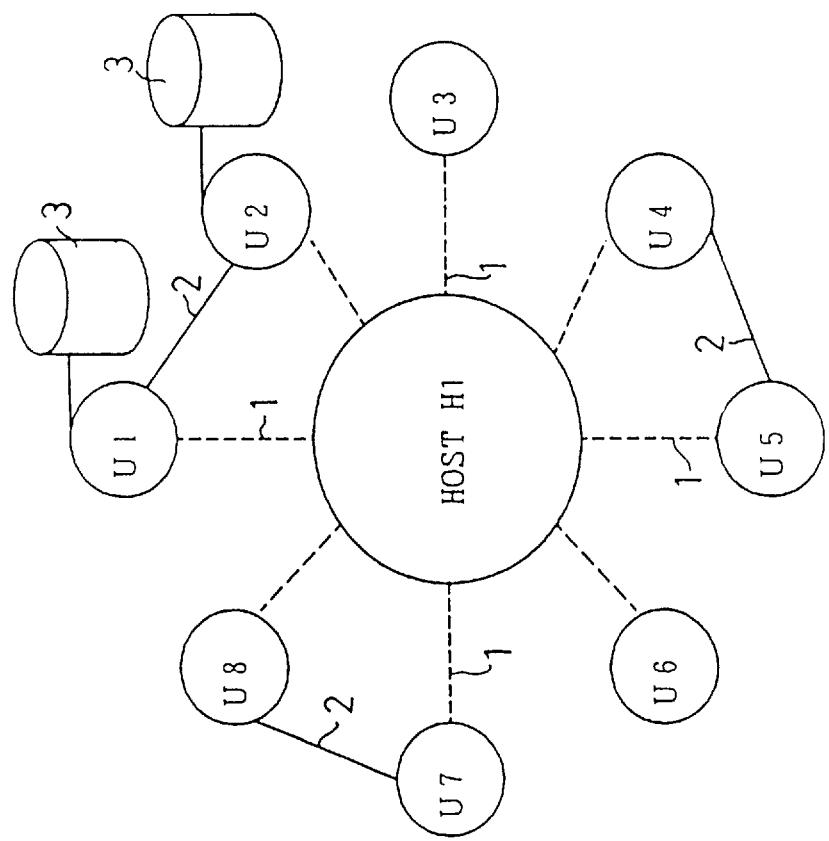
FIG. 1 is a diagram showing the basic concept of a communication network structure according to the present invention.

FIG. 1 shows a communication network structure according to the present invention.

The communication network structure of the present invention is similar to the conventional communication network structure in the following point: many user stations U1, U2, . . . and a host station H1 are linked to one another through a communication network 1, and the host station H1 is located at the center of the user stations U1, U2, . . . which are radially connected to the host station H1. However, these communication network structures are different in the following point: there is formed a communication network 2 through which user stations are mutually connected to one another without passing through the host station H1, and if occasion requests, the communication network 2 is connected between user stations to directly communicate a large amount of data between the user stations. Viewing from a specific user station, the communication network 1 and the communication network 2 are not connected to the user at the same time, and one of the networks 1 and 2 is alternatively selected. However, when a settlement of accounts or a credit inquiry on line is made on a real-time basis, the communication network 1 and the communication network 2 may be connected to the user at the same time to thereby connect three points (i.e., two user stations and the host station) to one another.

The data transmission and reception amount of the communication network 2 is still larger than that of the communication network 1, and thus unlike the conventional communication network structure, each user station in the communication network structure of the present invention is equipped with a large-capacity of storing medium 3.

Both of a wire communication network and a wireless communication network may be used as the first and second communication networks 1 and 2.

Both a public network and an exclusive network may be used as the wire communication, and both an ISDN network and an analog telephone network may be used as the public network.

Not only a fixed telephone network, but also a portable wireless telephone network, a personal handy phone network which is expected to propagate in the future, etc., may be used.

Furthermore, both an amateur wireless network and a business wireless network may be used as the wireless communication network. Furthermore, one or both of the consciousness information registered in the host station and the knowledge information stocked in each user station may contain video information.

There are two cases where video information is contained in the consciousness information registered in the host station and the knowledge information stocked in each user station and where no video information is contained in these consciousness information and the knowledge information.

Figure 2:
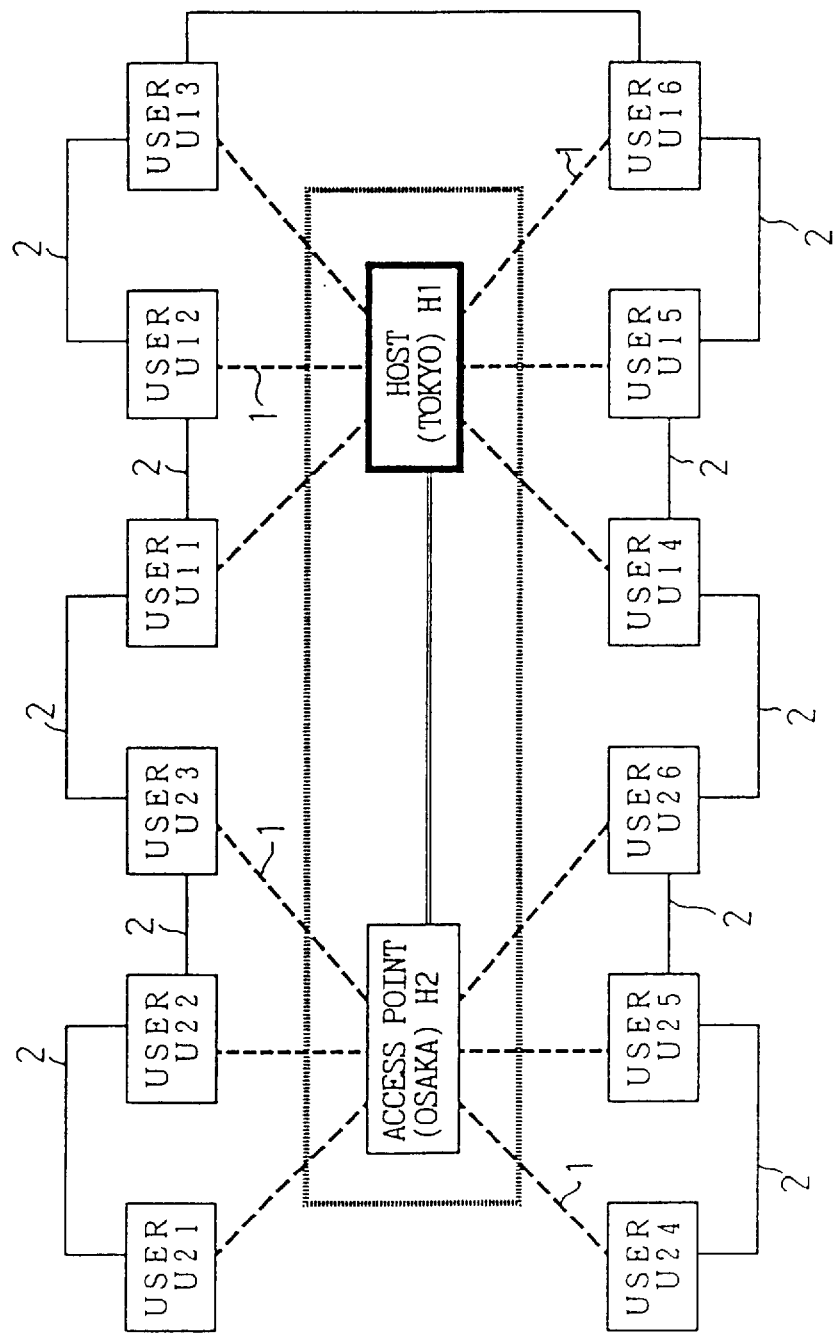
FIG. 2 is a diagram showing the concept of the present invention when an access pointer is disposed.

FIG. 2 is a diagram showing the concept of the present invention when plural host stations H1 and H2 are provided and the one host station H2 is used as an access pointer.

Each of user stations U11 to U16 is connected to the host station H1 through a communication network 1 if occasion requests, and each of use stations U21 to U26 is connected to the host station H2 (access point) H2. Furthermore, the user stations are also connected to one another through a communication network 2 if occasion requests. For example, in case of Japan, the host station H1 is disposed in Tokyo and it has functions as a main device. On the other hand, the host station H2 serves as a sub device which is disposed in various main cities such as Osaka, etc., and it has functions as an access point to reduce excessive increase in communication expenses. The host station H1 serving as the main device and the host station H2 serving gas the access point are connected to an exclusively used high-speed digital line at all times.

In this network system, the amount of data which are stocked in the host station is remarkably smaller as compared with the conventional network system, so that a load imposed on the host station is very small and thus many access points can be disposed at a low equipment investment.

Figure 3:
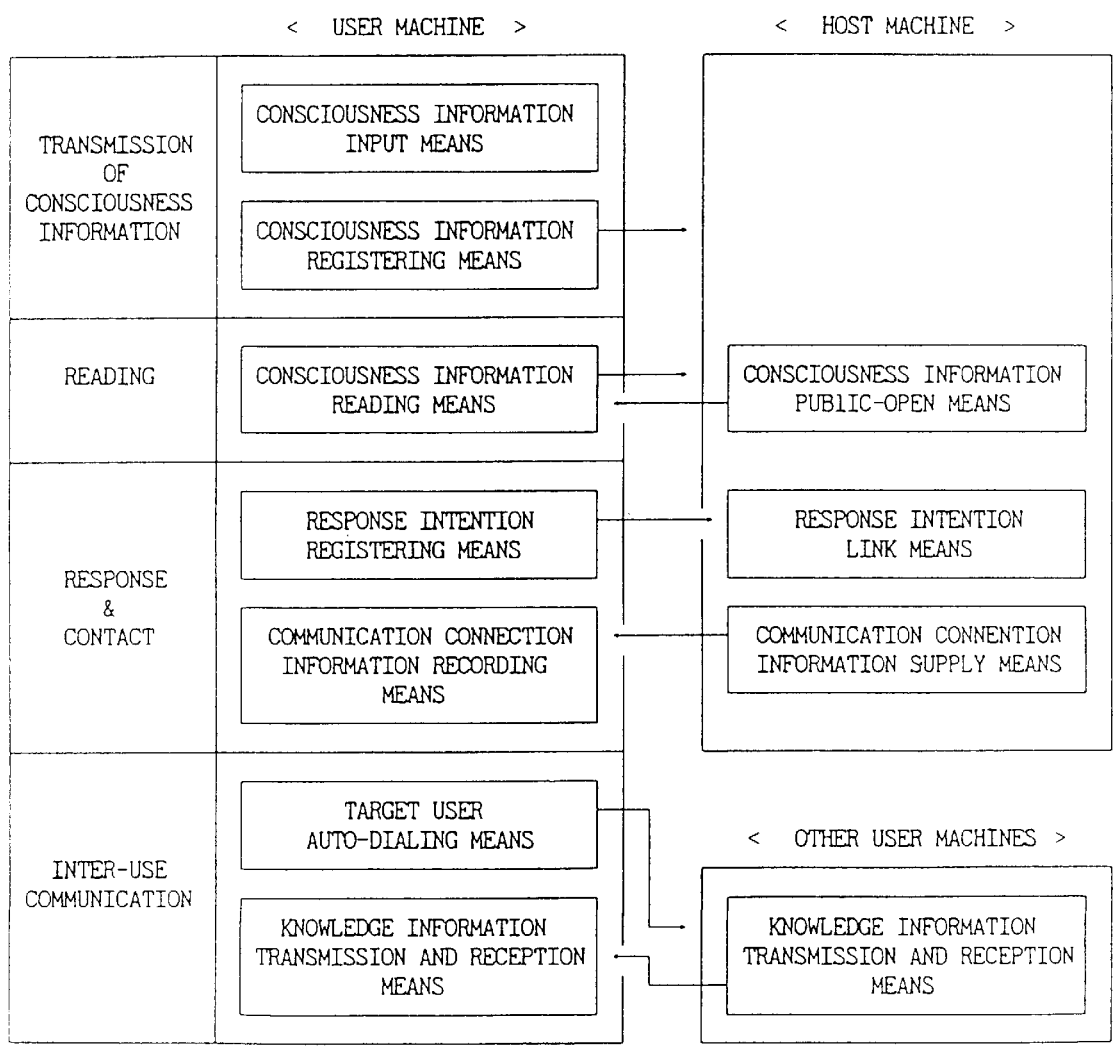
FIG. 3 is a diagram showing an example of the internal construction a user machine and a host machine in the communication network system of the present invention.

FIG. 3 shows a functional diagram showing the whole construction of the communication network system of the present invention. The communication network system of the present invention comprises plural user stations, at least one host station and a communication network for mutually connecting these stations. Each of an user machine disposed at each user station and a host machine disposed at the host station has respective means as shown in FIG. 3.

Figure 4:
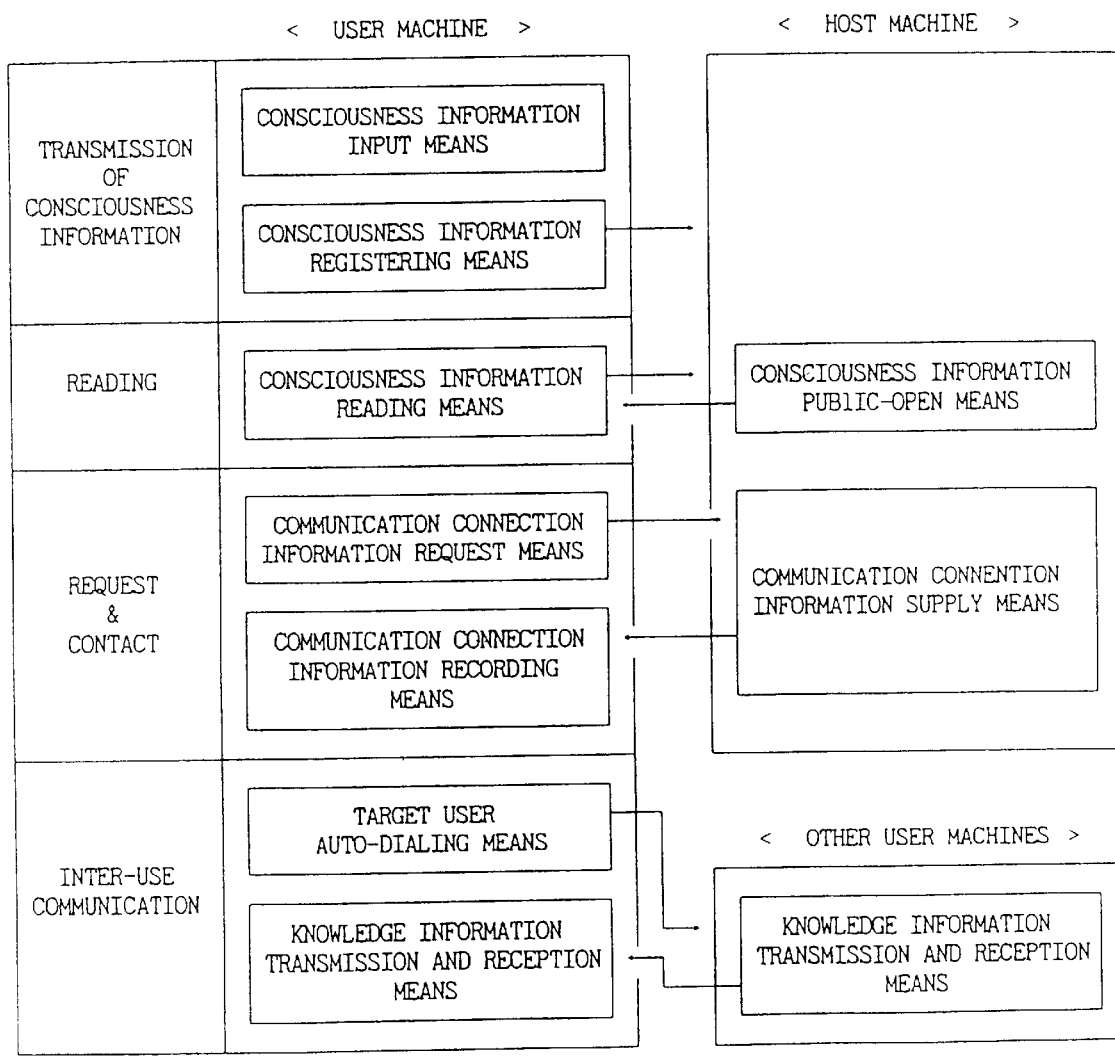
FIG. 4 is a diagram showing another example of the internal construction of the user machine and the host machine in the communication network system of the present invention.

Those functions which are achieved by the respective means are realized by the hardware construction of a multimedia equipment as described later and software for controlling the hardware. In this system, "response intention registering means" in the user machine as shown in FIG. 3 may be replaced by "communication connection information request means" as shown in FIG. 4, and two means of "correspondence intention link means" and "communication connection information supply means" as shown in FIG. 3 may be replaced by one means of "communication connection information supply means". The detailed description of each means will be made in the description for the communication method of the communication network system of the present invention, and thus it is omitted from the following description.

Figure 5:
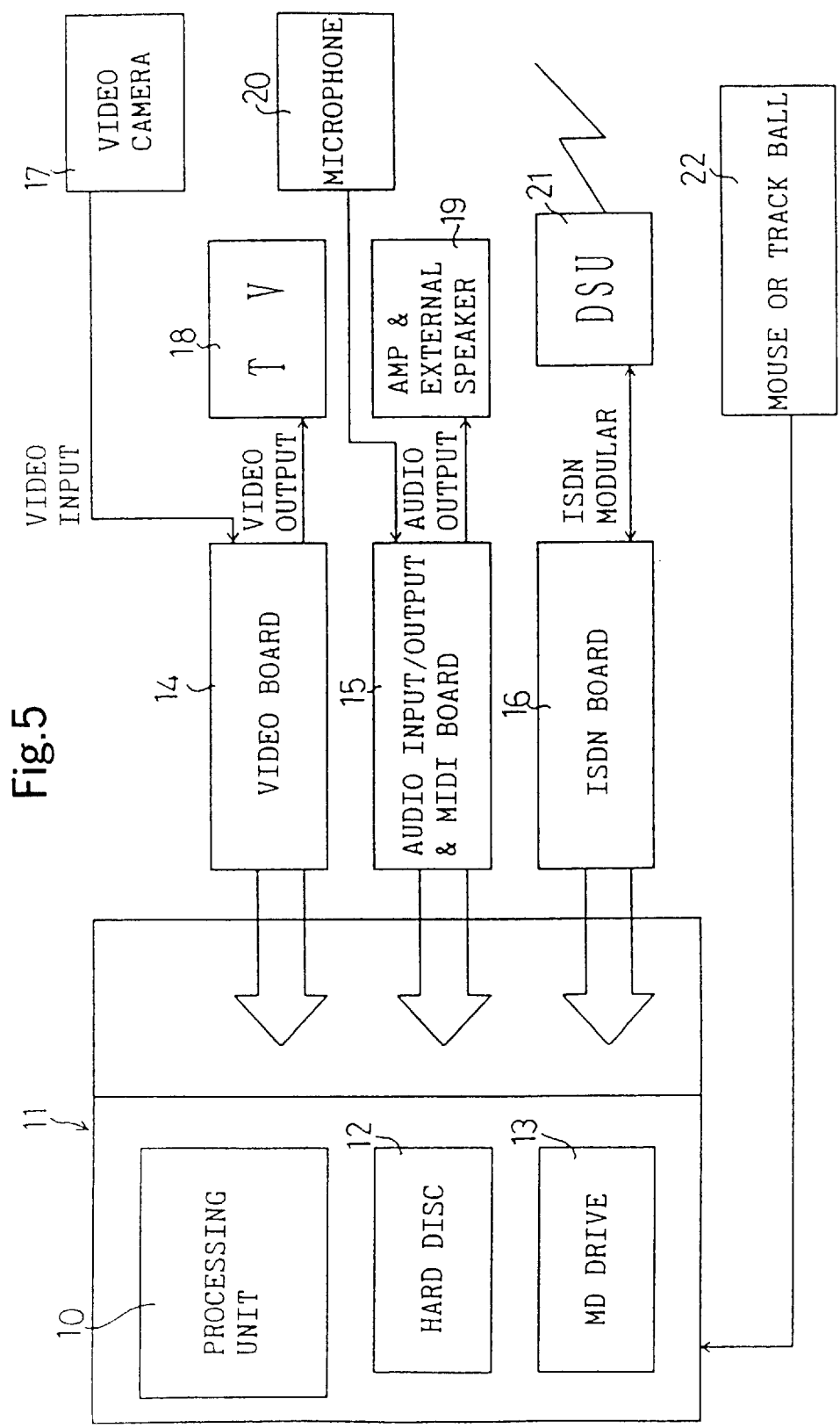
FIG. 5 is a block diagram showing the system construction of an embodiment of a user machine used in the communication network system of the present invention.
Figure 6:
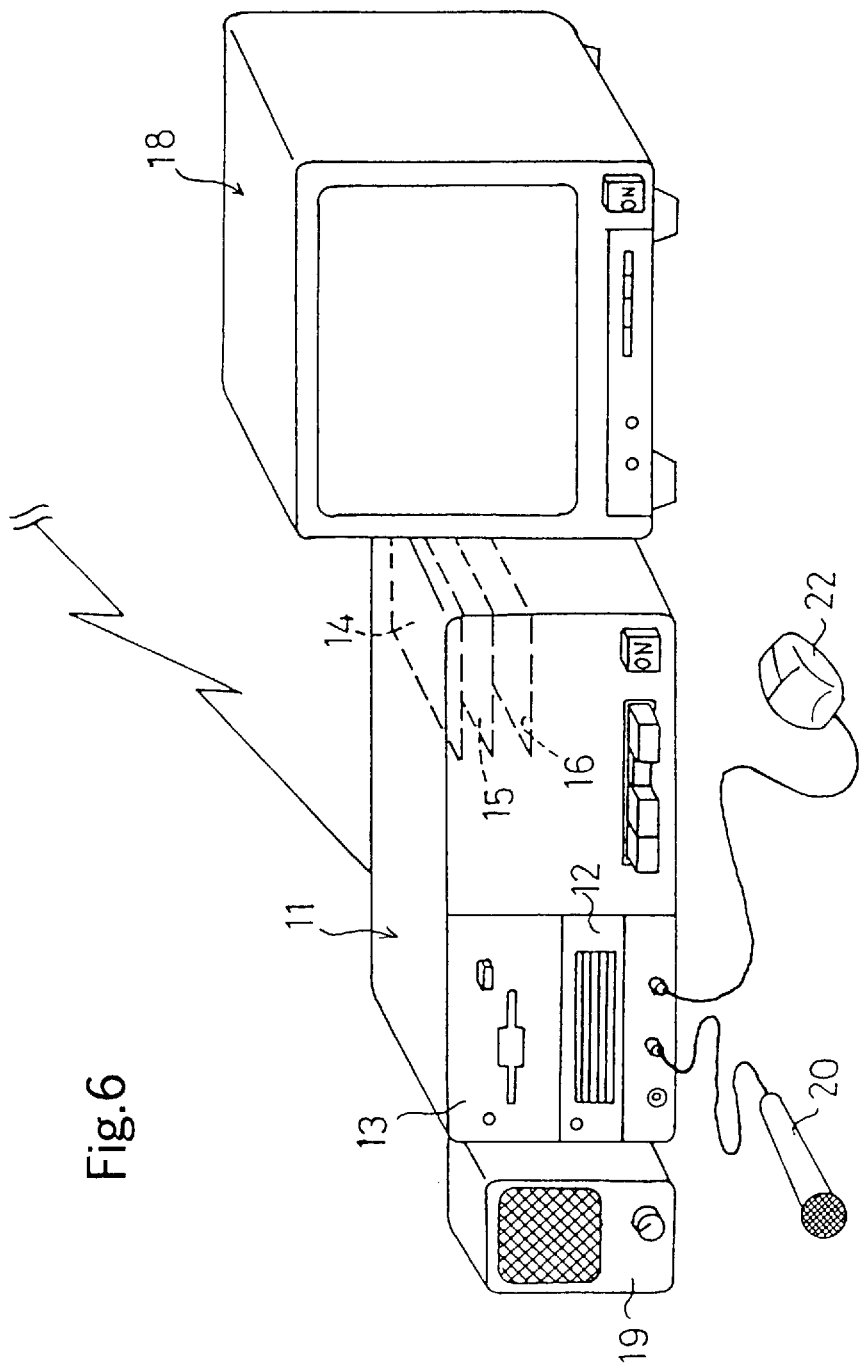
FIG. 6 a perspective view showing the outline of the user machine.

FIGS. 5 and 6 show an embodiment of the user machine which is disposed at each user station, where FIG. 5 is a block diagram showing the construction of the user machine and FIG. 6 shows the outline of the user machine. The user machine is designed to be easily operated so that all users from children to old persons can use it without reluctance, and it has various functions such as a television telephone function, a general telephone function, an automatic telephone message recording function, a video picture receiving, editing and transmitting function, a personal computer function, a game function. etc., and it has also information security functions such as an alter-preventing function of recording data, a function of preventing the machine from being unfairly used by another person.

Specifically, as shown in FIG. 5, a computer body 11 having a processing unit 10 is equipped with a hard disc 12 for supplying a temporarily storing area for various data and a work area, and a magnetooptical disc drive (MD) 13 serving as a large-capacity recording medium for recording document data, image data, audio data, etc., and also equipped with a VIDEO board 14 connected directly to a CPU bus, an audio input/output & MIDI (sound source) board 15 and an ISDN (integrated service digital network) board 16 which are mounted in an expansion slot on the back side of the computer body 11. The VIDEO board 14 is connected to a video camera 17 or a VTR to enable a video input thereto. Furthermore, a video signal may be output through the VIDEO board 14 to a domestic TV so that pictures can be displayed on the domestic TV 18 with no exclusively-used CRT display. In place of the domestic TV, a CRT display may be used.

Furthermore, the computer body 11 and the CRT display may be unified into one body (not shown). In addition, an AMP (audio signal amplifier) & external speaker 19 is connected to the output terminal of the audio input/output & MIDI board 15 to achieve high-quality voice (containing music and mere sound). Furthermore, a microphone 20 is connected to the input side of the audio input/output & MIDI board 15 to enable audio input.

The audio input through the microphone may be used not only to prepare an audio file to be transmitted to the host station or another user station serving as a dialogue target, but also instruct an operation to the multimedia equipment with voice by adding a voice recognition function to the user machine. In place of the microphone may be used something like a receiver of an existing telephone.

A DSU (data circuit terminating equipment) 21 is connected to the ISDN board 16, and it is connected to the ISDN which is called as an INS net 64 or INS net 1500. The ISDN can transmit a large amount of data at a high speed, and thus it is suitable for data transmission containing images. In addition, it has a calling side telephone number notifying function in which the telephone number of a calling side is displayed before a receiver is taken, so that a communication rejecting right can be secured. The notified calling side telephone number is usually managed by the user machine, and thus it is not directly notified to an user. However, the user machine is preferably designed so that the above function is usable by selecting an option mode if occasion requests.

Furthermore, by checking the conformity (consistence) between an user ID number and a notified calling-side number, that is, verifying these numbers, the user himself can be identified, so that the credit inquiry and the settlement of accounts for on-line shopping can be accurately performed.

It is needless to say that the ISDN is preferably used because images, etc. are used as a target to be treated in this system. However, a general analog circuit may be used by using a technique such as a data compression technique or the like in combination with this system.

Reference numeral 22 in FIG. 5 shows an input indication device which is represented by a mouse or a track ball. The user machine is designed so that any one can operate it easily, and thus the user machine is designed on the condition that no keyboard is not basically connected to the user machine, and all the input indication operations are performed by a simple input means such as a mouse, a track ball, a key pad which is used for a touch panel and a game machine, or the like. It may be suitably adopted that only ten keys are provided, or a full size key board is optionally provided for persons which are familiar with the keyboard operation, as not shown. Furthermore, a simple image reader such as a handy scanner or the like may be connected to the user station.

The communication method using the multimedia equipment as described above comprises the following processes.

Figure 7:
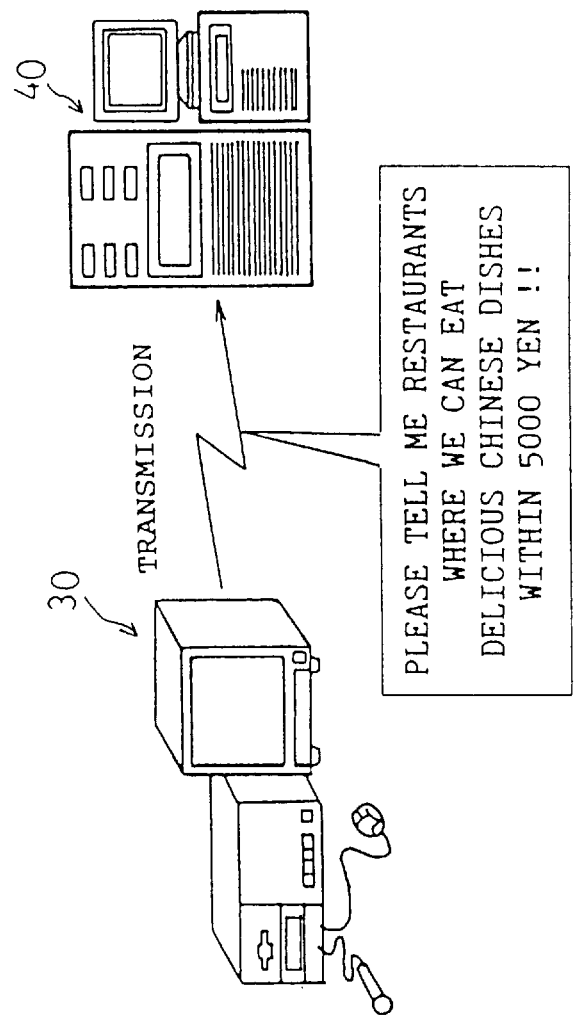
FIG. 7 is a diagram showing a message registering process in a communication method of the present invention.

<Consciousness information registering process> (see FIG. 7)

This process is a process of transmitting user's consciousness from the user to another user which is linked to a network, and consciousness information is registered in the form of a message.

An user who makes a request or inquiry to another user and wants to obtain some response thereto, first operates his user machine 30 to make a short message which is the summary of his intention contents. The message comprises audio data which are recorded through a microphone, video data which are prepared through a video camera, or text document data which are input through an operation of a mouse or keyboard. In this case, it is important that restriction is imposed on the total information amount of the message thus formed.

The message thus formed is transmitted from the user machine 30 to the host machine 40 in the form of an electronic computer originated mail, and then registered as consciousness information in the consciousness data base which is built on the host machine 40. An access procedure from the user machine 30 to the host machine 40 is entirely automated, and a communication line with the host machine 40 is interrupted after the registration. The registered consciousness information is kept in the consciousness data base for a fixed period. The retention period is individually set in accordance with the kind, the size and the data format of the consciousness information. For example, when a large amount of data such as image data, audio data or the like are contained in the consciousness information, the retention period is set to a short value so that the load on the host machine 40 is reduced.

FIG. 7 shows an example of the registering process in which a piece of consciousness information "Please tell me chinese restaurants around Osaka where we can eat delicious chinese dishes within 5000 yen" is registered in the host machine 40.

<Consciousness information publicly-opening process>

When the consciousness information transmitted from the user through the network is registered in the consciousness data base, the host machine 40 arranges such various consciousness information of respective users and opens the arranged consciousness information group to users (network members) through the network. The consciousness information which is registered in the consciousness data base is opened to the users with no restriction within the retention period of each consciousness information, and when the data retention period is over, restriction is imposed on the public-opening or the data are deleted from the consciousness data base.

For the public-opening, there are used two cases where information is opened to all the users and where information is opened to specific members. In this case, a judgment on whether the information should be opened to an user is made on the basis of his ID number.

A manual arrangement and classification of the consciousness information imposes an enormous load on an operator, and thus it is preferable to automatically perform the arrangement and classification by the host machine 40. In order to perform the automatic classification by the host machine 40, for example, the following methods may be considered. One method is that the consciousness information is classified by using words contained in the consciousness information as key words, and the other method is that the registration of the consciousness information itself is performed by selecting the closest one of plural responses which are beforehand prepared for a finite number of preset inquiry items (i.e., a multiple choice questionnaire system is used). Particularly when the multiple choice questionnaire is adopted, the content of the consciousness information itself is represented by an assembly of numeral values or codes as responses to the questionnaire, so that the mechanical arrangement and classification by the host machine 40 can be extremely facilitated.

Figure 8:
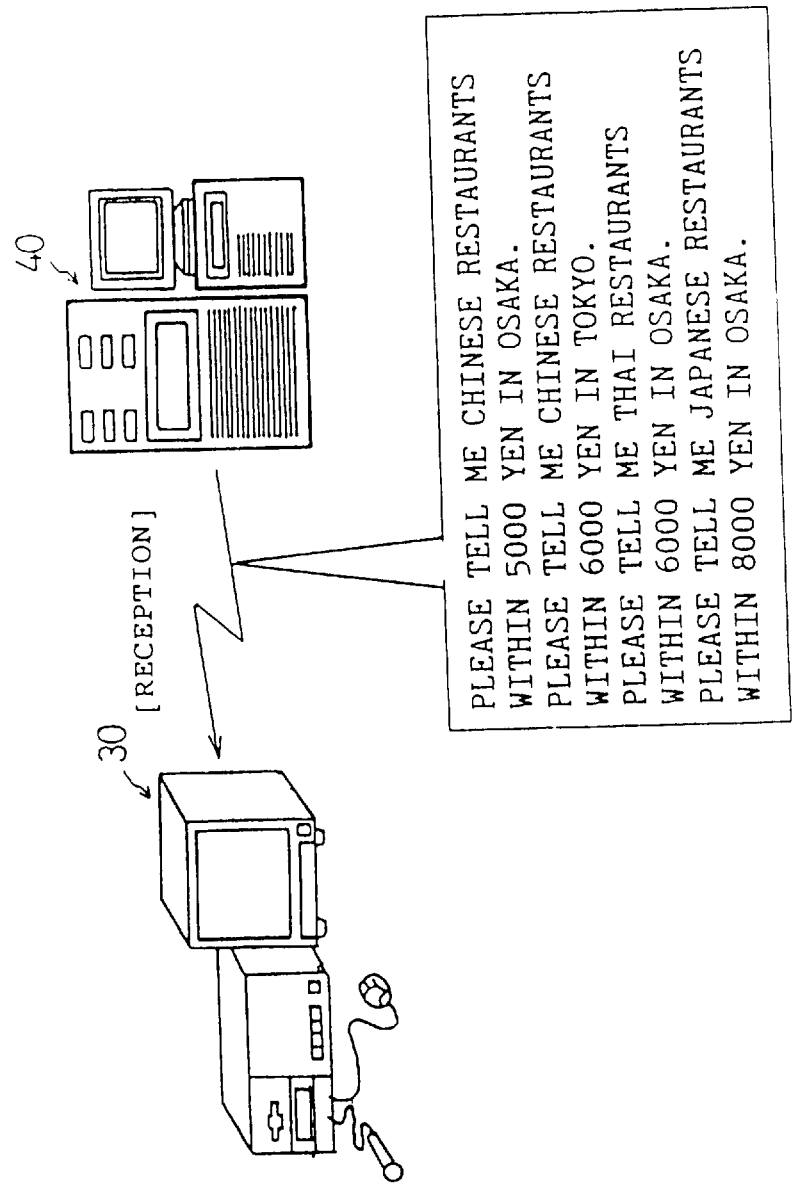
FIG. 8 is a diagram showing a message reading process in the communication method.

<Consciousness information reading process> (see FIG. 8)

In this process, an user operates his user machine to access consciousness data base stored in the host machine 40 through the network and reads the consciousness information of another user. The reading of the consciousness data base is performed with a searching method using key words, or a method in which the consciousness data base is classified from a big classification to a small classification like a tree structure, and the hierarchy of this tree structure is traced from a higher stage to a lower stage to find out desired consciousness information.

FIG. 8 shows a situation where an user (hereinafter referred to as "reading user") different from the user who has registered the consciousness information in the <consciousness information registering process> as described above reads the consciousness data base. As shown in FIG. 8, in a consciousness information group represented as a list, the consciousness information of "Please tell me chinese restaurants around Osaka where we can eat delicious chinese dishes within 5000 yen" which was registered by the user is edited to a brief message "Please tell me chinese restaurant within 5000 yen in Osaka", and then displayed on the top stage of the list.

Figure 9:
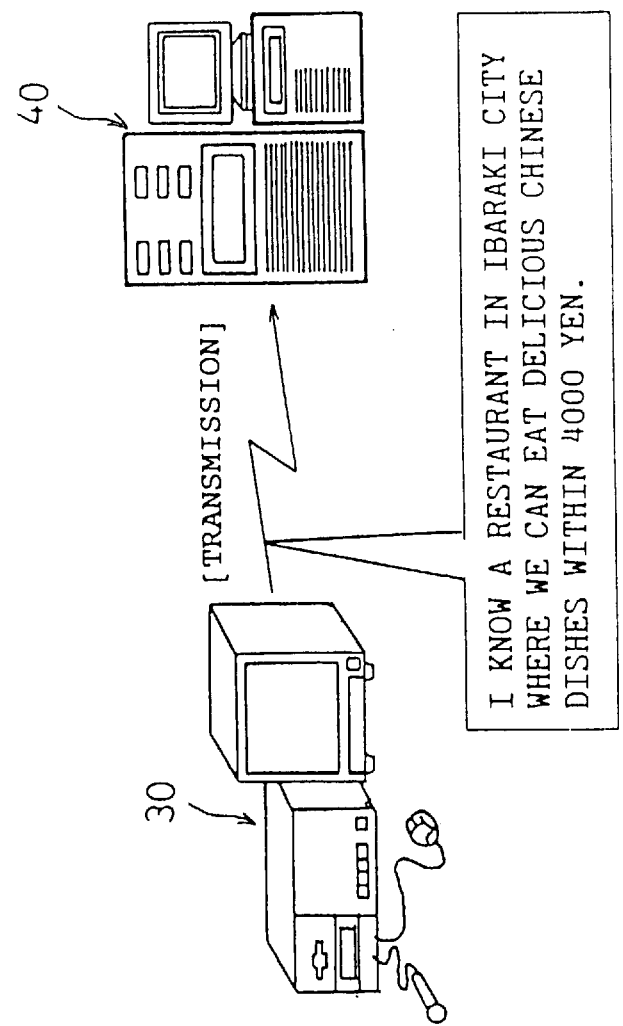
FIG. 9 is a diagram showing a response intention registering process in the communication method.

<Response intention registering process> (see FIG. 9)

In this process, when the reading user finds out consciousness information to which he can respond, he expresses his intention of responding to the consciousness information to the host station 40. The expression of the response intention is performed by specifying the consciousness information concerned and registering his ID number for the communication network and his response message into a mail box which is provided in association with the consciousness information. The response message may be provided with not only the brief description of a response content which he can supply, but also his profile. However, in this case, it should be avoided to insert his telephone number, etc. into the response message. User's telephone numbers and basic private information are managed in association with user's ID numbers by the host machine 40, and thus the users should use this. The telephone number and the basic private information of each user is also used for a matching operation in the following <correspondence intention link process>.

FIG. 9 shows a situation where an user who has an intention of responding to the calling message "Please tell me chinese restaurants within 5000 yen in Osaka". Registers information (response) "I know a restaurant in Ibaraki city where we can eat chinese dishes within 4000 yen" into the host machine 40.

Figure 10:
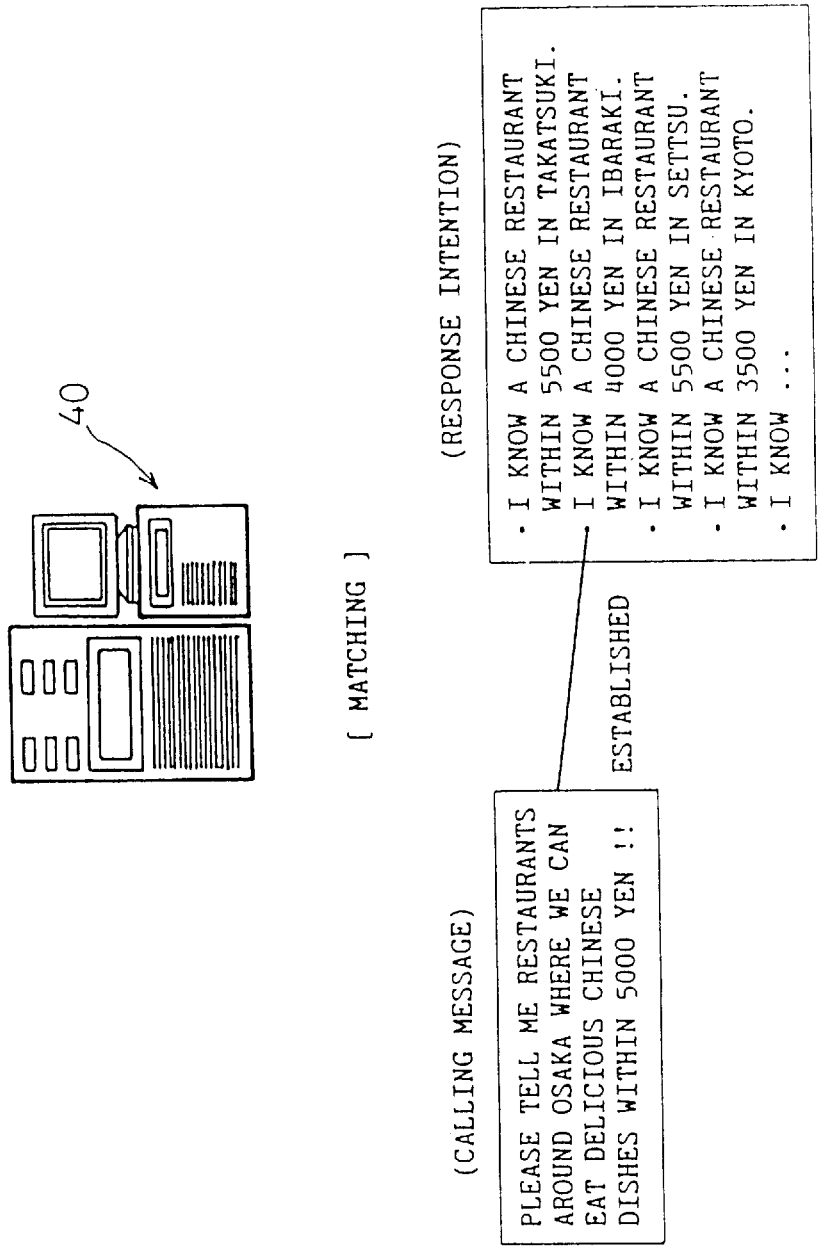
FIG. 10 is a diagram showing a correspondence intention link process in the communication method.

<Correspondence intention link process> (see FIG. 10)

In this process, the host station performs a matching operation between each consciousness information registered in the consciousness data base and the response intention content which is expressed to the respective consciousness information. The matching operation is generally performed between the consciousness information in the consciousness data base and the response intention to the consciousness information concerned. However, when no corresponding response intention is expressed, the matching work may be performed between messages registered in the consciousness data base. The matching can be judged by numerically estimating the degree of coincidence of key words. The matching operation may be performed so that only both the consciousness information and the response intention which are perfectly coincident with each other (i.e., provides perfectly coincident correspondence relationship)

are extracted. However, in place of the above perfect coincidence requirement, it may be considered that the correspondence relationship between the consciousness information and the response intention is ranked in accordance with the degree of closeness (coincidence) to secure preliminary candidates and select a second candidate as a next candidate when a dialogue with the first candidate is unestablished.

The consciousness information and the response intention for which the coincidence is judged through the matching work are subjected to a string process or a grouping processing, and then managed in the host station 40. The matching operation may be periodically performed every a fixed time lapse within a registration retention period of the message, or it may be performed at a stage where the number of unestimated response intention contents reaches a predetermined value, or it may be performed on real time basis every time a new response intention is registered.

As another example of the matching operation, it may be adopted that the matching operation is freely performed with no restriction in coincidence of theme to enjoy unexpectedness.

FIG. 10 shows a situation where since there are plural responses to the consciousness information "Please tell me chinese restaurants around Osaka where we can eat delicious chinese dishes within 5000 yen" which is inquired by the first user, the matching operation between the consciousness information and the response intention contents is performed in the host station and it is judged through the matching operation that a response intention "I know a restaurant in Ibaraki city where we can eat delicious chinese dishes within 4000 yen" is most coincident with the consciousness information.

Figure 11:
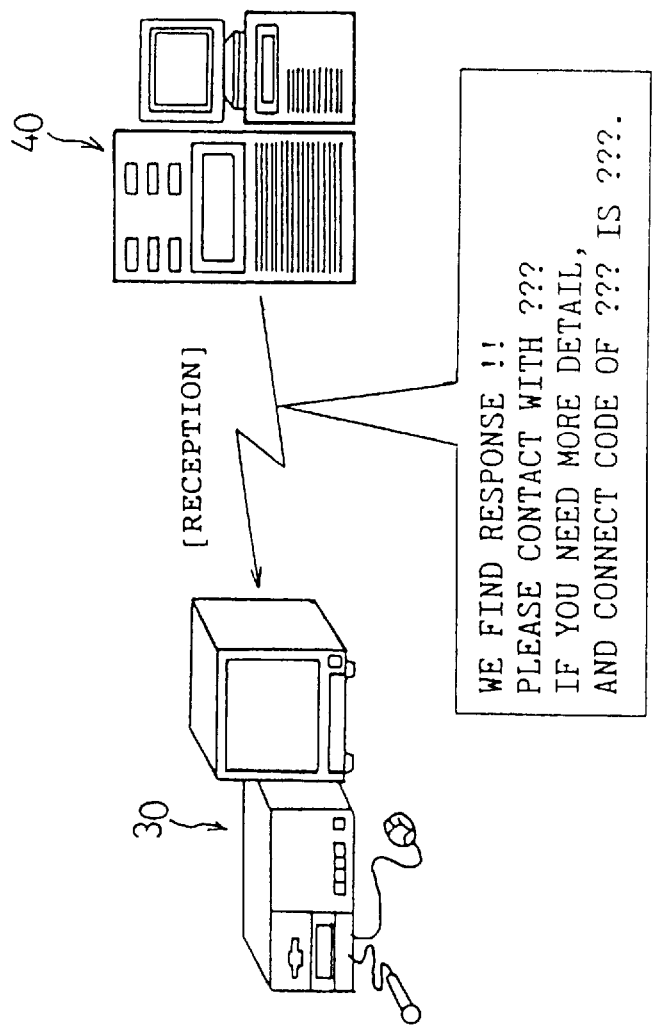
FIG. 11 is a diagram showing a communication connection information supply process in the communication method.

<Communication connection information supply process> (see FIG. 11)

In this process, when the intention link succeeds in the correspondence intention link process, the matching success is notified to one or both of the user registering the consciousness information and the user registering the response intention, and the communication connection information to enable a direct communication with the target user (dialogue target) is supplied to the user registering the consciousness information or the user registering the response intention. In this case, the problem is the content of information to be notified to the users and the timing of the notification. The notification timing may be set on real time basis at a time when a response is given. However, this method makes the matching work substantially insignificant, and thus it is better to wait for the notification until a predetermined number of responses are stocked.

Furthermore, the content of the communication connection information is required to contain at least a telephone number because an user receiving the communication connection information must connect his communication line to the user who expresses his response intention. However, it is not preferable that the telephone number is informed to another user because it may be abused for the purposes other than the desired communication purpose to induce a problem in privacy. In order to avoid such a situation, it is a better way that the telephone number is contained in the communication connection information, however, it is kept invisible to an user who operates the user machine 30 or it is coded. For example, the invisible state corresponds to a case where the received communication connection information is stored in the memory while not being displayed on a display frame. In the case where the telephone number is coded, received characters are decoded in an invisible area of the user machine 30. The communication connection information is recorded in the memory of the user machine 30, an HDD, a MD or the like, and at this time the communication network between the user station and the host station is interrupted.

FIG. 11 shows a situation that the matching success is notified to the user who has registered the calling message "Please tell me Chinese restaurants around Osaka where we can eat delicious Chinese dishes within 5000 yen", and also notifies him of the communication connection information on the target user which is a dialogue target.

Figure 12:
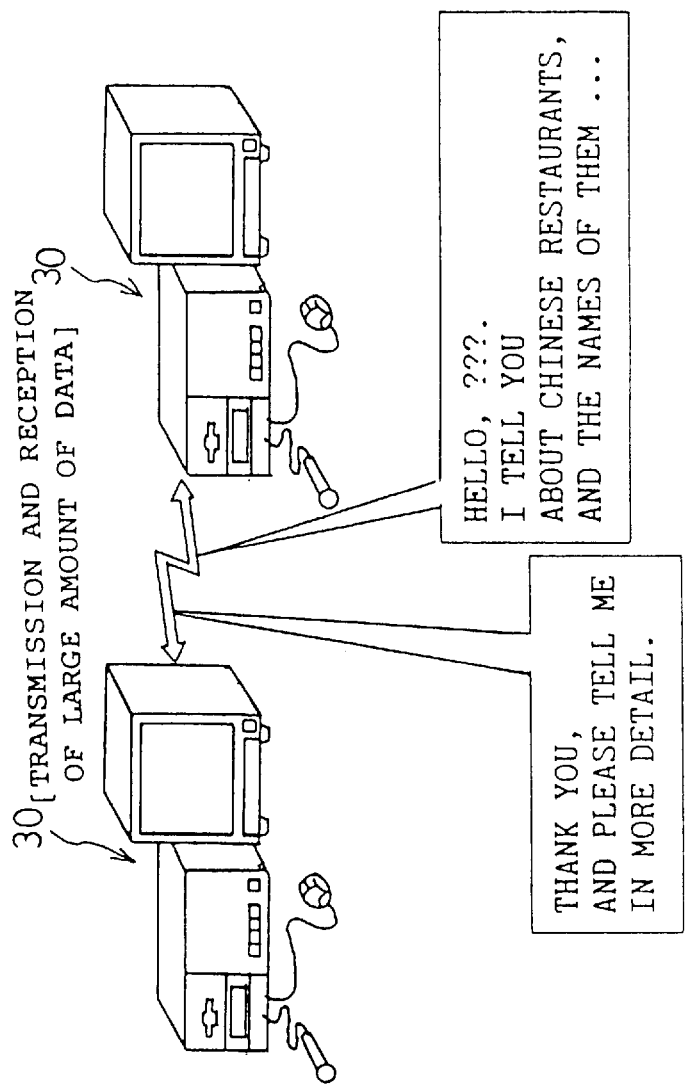
FIG. 12 is a diagram showing an inter-use communication process in the communication method.

<Inter-user communication process> (see FIG. 12)

In this process, the user machine 30 reads out the communication connection information stored in the memory or other recording medium, and automatically dials the target user to connect the communication network between the user stations, whereby detailed information can be directly delivered between the user stations.

As data to be communicated may be used video data, audio data, one type of text relating data or composite data. The data amount (size) is freely set, however, it is a rule that the data amount should be determined on the basis of the responsibility between users because the communication is performed between the users themselves. Here, the responsibility between users means that the communication must be performed in consideration of the performance and scale of the user machines 30 owned by the users concerned, and further in consideration of the load in communication expenses of a long-distance communication because of the inter-user communication through no access point. It is needless to say that the communication protocol is identical between the users concerned, however, it is preferable that the communication protocol is unified among all user stations in order to perform a smooth communication with another user at all times even when the target user is changed. Accordingly, in order to realize this, it is the most realistic way to adopt such a rental system in which the manager of the network lends each user a user machine 30 itself.

FIG. 12 shows a situation where the users directly communicate with each other through no host machine to transmit and receive the detailed data.

In the <response intention registering process> and the <correspondence intention link process> as described above, the determination of the dialogue target is made through the matching work of the host machine. In place of this method, the determination of the dialogue target may be made on the basis of only the selection of an user who reads a list of the consciousness information. In this case, a process of <communication connection information request process> may be used in place of the <response intention registering process> and the <correspondence intention link process>.

Figure 13:
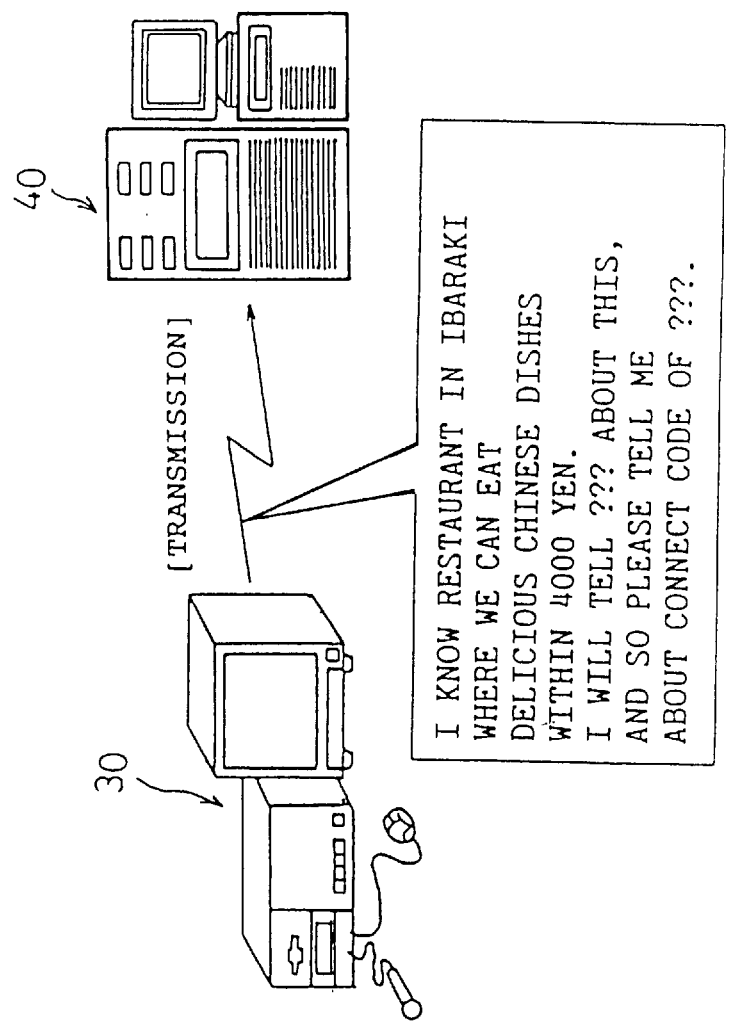
FIG. 13 is a diagram showing communication connection information request means in place of the response intention registering process and the correspondence intention link process in the communication method.

<Communication connection information request process> (see FIG. 13)

In this process, when the user finds out from the summarized data base a message to which he can respond, he requests the host station to supply him with the communication connection information so that he can directly communicate with an user who has registered the message concerned. In this method, the host station carries out no matching operation, and in response to an user's request, it supplies the communication connection information to the user with substantially no examination. The network of this invention is fundamentally based on the principle that the communication is performed on user's own responsibility, and thus no pre-check is required. However, this principle does not exclude the minimum checking operation of checking habitual users who induce problems on the network on the network.

FIG. 13 shows a situation where the response intention of "I know a restaurant in Ibaraki city where we can eat delicious chinese dishes within 4000 yen" is expressed for the calling message of "Please tell me Chinese restaurants around Osaka where we can eat delicious Chinese dishes within 5000 yen", and the same time the user requests the host station to immediately supply him with the communication connection information on the user who has registered the calling message.

Next, the services which are given from the communication network system of the present invention will be described.

Classifying the services given from the network system mainly on the basis of the correspondence relationship between user stations, these services are classifiable into "I:N type service", "N:N type service" and "I:I type service". In addition to these services, there is a "DB service" in which each user uses various data bases connected to the host station. Each service is given with a combination of audio data, video data, etc., and it is set to enable the multimedia function of the user machine to be most effectively used.

As "I:N type service" may be listed free market, garage sale (sale/buy), private auction, network shopping (communication sale), ticket/event information, enterprise supply commercials, etc.

As "N:N type service" may be listed a scoop video contest, a photograph contest, a meeting for mass interview with a view to marriage, a battle meeting for determination of quiz champion, a meeting for original video exchange, etc.

As "I:I type service" may be listed TV telephone, automatic telephone message recorder, Video image communication, Is any person who can communicate with me on telephone? (for old people), advice for human life/psychological counseling, navigation (operation instruction), etc.

As "OD service" may be listed NEWS data base, video encyclopedia, data base of intellectuals, etc.

Figure 14:
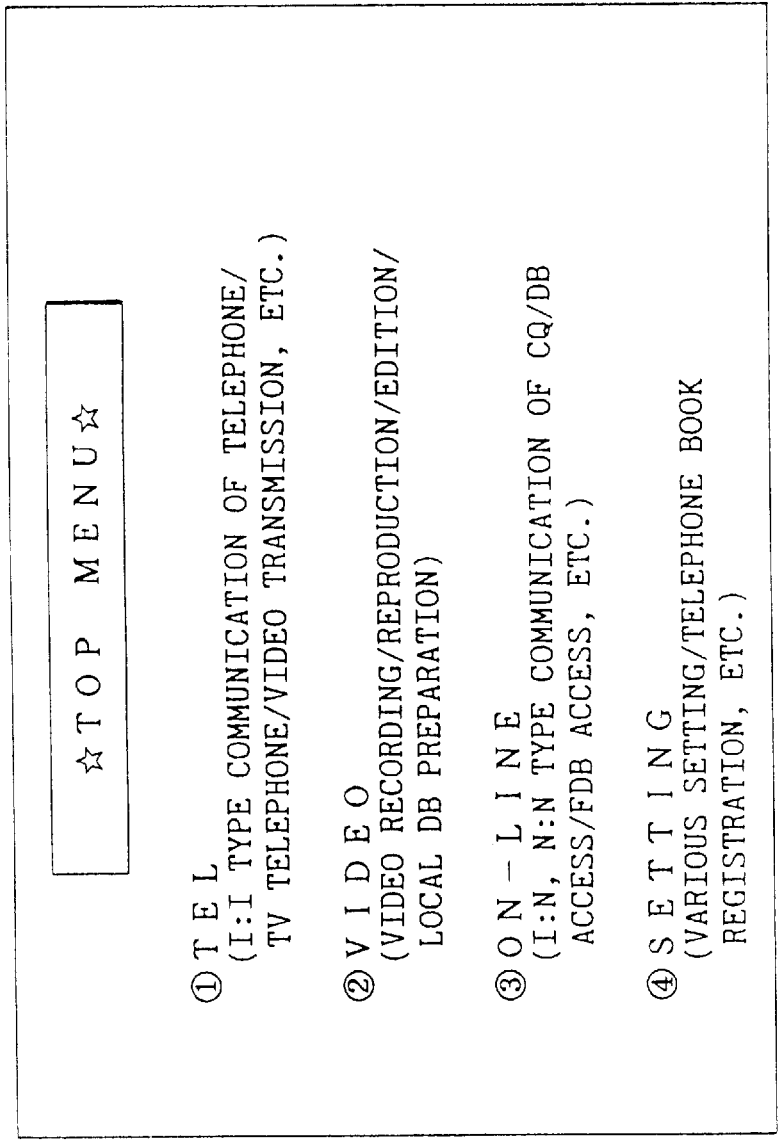
FIG. 14 is a diagram showing an example of a top menu at a user machine starting time.
Figure 15:
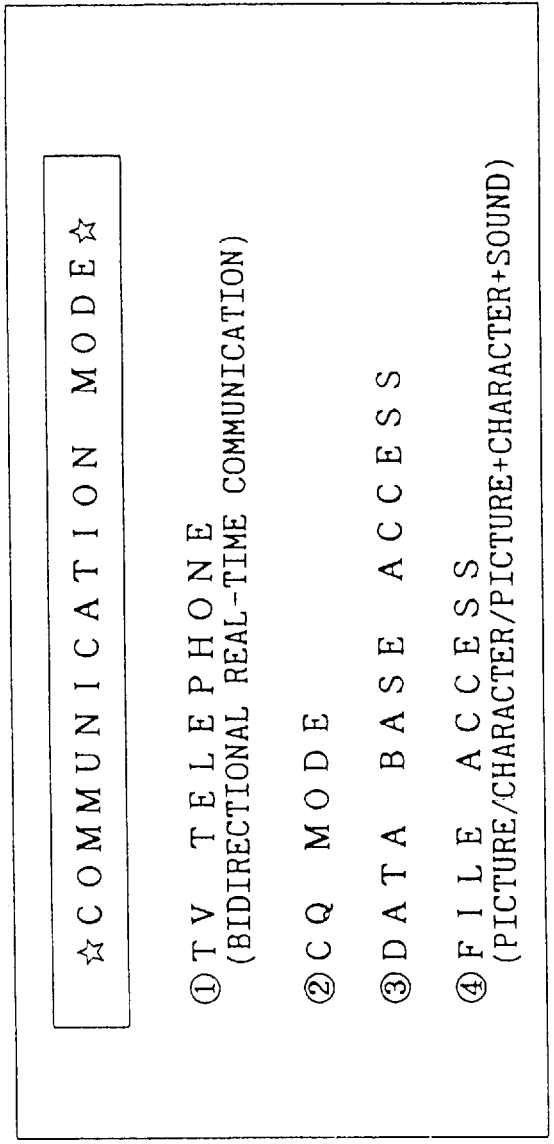
FIG. 15 is a diagram showing an example of a menu at a communication mode selection time.

FIGS. 14 and 15 are examples of the menu displayed on a TV screen serving as a display device of the user machine.

FIG. 14 shows an example of a top menu frame when the user machine is started, and FIG. 15 shows an example of the menu frame when a communication mode is selected. "CQ mode" in FIG. 15 is a calling mode for calling many and unspecified persons. "TV telephone" in FIGS. 14 and 15 is a service which has been substantially impossible in the conventional communication network system. In the conventional communication network system, data are temporarily registered in the recording medium of the host machine, and then picked up by another user, so that it is impossible to perform data delivery between users on real time basis. However, in this system, the direct data communication can be performed between the users on real time basis, and thus the TV telephone service can be performed.

Next, a registering operation of the consciousness information which is required to use items other than the use of data base as various information services given by the host machine, of the items shown in FIGS. 14 and 15, will be described hereunder.

Figure 16:
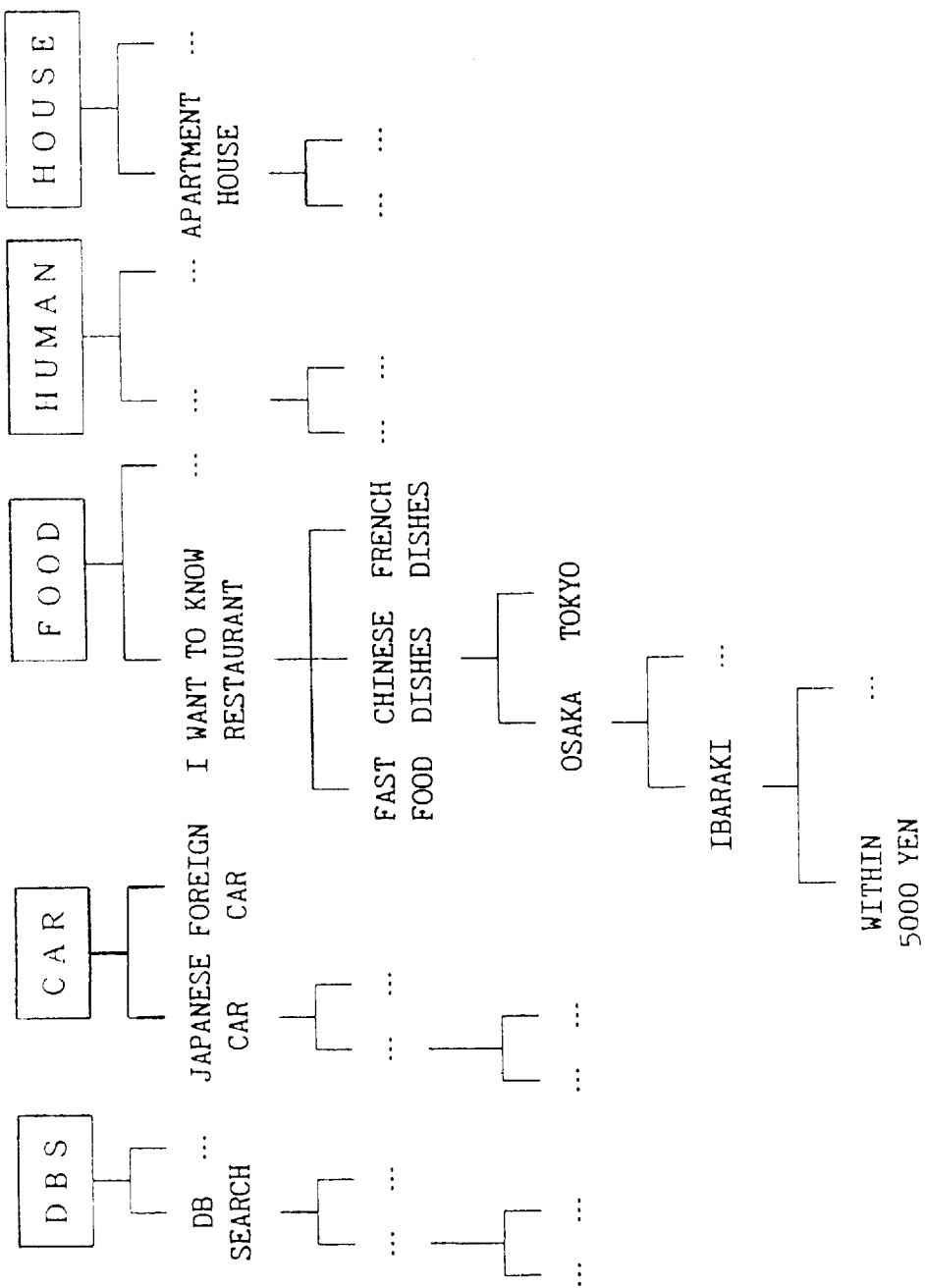
FIG. 16 is a diagram showing an example of a tree structure of a message registering questionnaire.

The content of the consciousness information is mainly classified into reception type information shown in <table 1> and transmission type information shown in <table 2>, and each of the reception and transmission type information is designed in such a tree structure having plural items such as rough classification", "consciousness content", "large area", "middle area" "small area", "genre", "price", "others", etc. as shown in FIG. 16. By responding these items in a questionnaire style, The consciousness information which is the summary of user's consciousness and which the user wants to transmit as a message to another user is prepared and registered. The tree structure is also used when desired consciousness information is searched in the consciousness information reading process.

TABLE 1

Reception Type Information

| Rough Classification | Consciousness Content | Large Area | Middle Area | Small Area | Genre | Price | Others |
|---|---|---|---|---|---|---|---|
| | I want to know restaurant | Osaka | | | Chinese Dishes | Within ¥5,000. | |
| Food | I want to know restaurant | Osaka | | | Takoyaki | Within ¥1,000. | |
| Human | I want someone to talk to. | Osaka | Mino | Onohara | — | — | |
| | I want a boyfriend. | Tokyo | | | From 20 to 29 years old | — | |
| | I want a girlfriend. | Osaka | | | From 10 to 19 years old | — | |
| | I want to enter a circle. | Osaka | | | The game of go | Within ¥5,000. | |
| | I want to take part in Party. | Osaka | | | | Within ¥10,000. | |
| House | I want to buy house. | Nagoya | Hongo | | Detached House | Within 20 million yen | |
| | I want to buy house. | Osaka | Toyonaka | Sakurazuka | Apartment House | Within 50 million yen | |
| | p I want to rent house. | Tokyo | Roppongi | | Apartment House | | |
| Car | I want to buy car. | Osaka | Osaka | Yodogawa-ku | RV | Within 1 million yen | |
| | I want to buy car. | Tokyo | Ninato-ku | Roppongi | Benz | Within 10 million yen | |
| BBS | DB search | Osaka | | | | | |

TABLE 2

Reception Type Information

| Rough Classification | Consciousness Content | Large Area | Middle Area | Small Area | Genre | Price | Others |
|---|---|---|---|---|---|---|---|
| Food | I want to come to restaurant | Osaka | | | Chinese Dishes | Within ¥5,000. | |
| | want to come to restaurant | Osaka | Takoyaki | Within ¥1,000. | | | |
| Human | I want someone to talk to. | Osaka | Mino | Onohara | — | — | |
| | I want a girlfriend. | Tokyo | | | From 20 to 29 years old | — | |
| | I want a boyfriend. | Osaka | | | From 10 to 19 years old | — | |
| | Members wanted. | All places | | | The game of go | Within ¥5,000. | |
| | Participants of party wanted. | Osaka | Esaka | | | Within ¥10,000. | |

TABLE 2-continued

|  |  | Reception Type Information | | | | | |
|---|---|---|---|---|---|---|---|
| Rough Classification | Consciousness Content | Large Area | Middle Area | Small Area | Genre | Price | Others |
| House | I want to sale house. | Nagoya | Hongo |  | Detached House | Within 60 million yen |  |
|  | I want to sale house. | Osaka | Toyonaka | Sakurazuka | Apartment House | Within 50 million yen |  |
|  | I want to lend house. | Tokyo | Roppongi |  | Apartment House |  |  |
| Car | I want to sale car. | Osaka | Osaka | Yodogawa-ku | RV | Within 1 million yen |  |
|  | I want to sale car. | Tokyo | Ninato-ku | Roppongi | Benz | Within 10 million yen |  |
| BBS | I share. | Osaka | Ibaraki | Toyogawa | Vegetables | — |  |

<table 3> shows various registration types of consciousness information. For the registration of the consciousness information are prepared two modes, a communication mode A for a relatively small amount of data and a communication mode B for a relatively large amount of data. The communication mode A uses a data input manner using a questionnaire style, and a character input (text input) manner using a keyboard or a mouse. When the questionnaire style is used, input data comprises an assembly of codes and numeral values. When input data are represented with codes and numeral values, these data are registered in a code data base. On the other hand, when the character input is used, the input data are registered in a text data base. In the communication mode A, the user station and the host station are connected to each other through a D-channel packet communication because data amount to be treated per case (communication) is small. With respect to the data retention period, no restriction is imposed on the data retention period because the data amount itself is small. Furthermore, a real-time communication mode for such an electrical meeting that plural users enter at the same time is provided.

The communication mode B is used to register the consciousness information as video data or audio data. The data registration as described above is performed by using the multimedia function most effectively, and the input data are stocked in a video and audio data base. A B channel is used for these data because the data amount to be treated is large, and the data retention period is limited to three months. Furthermore, it is needless to say that video files and audio files are registered in a compression style, and an expanding operation for these compressed data is automatically performed by the user machine while no load is imposed on the user.

TALBE 3

| AP Mode |  | Message registering method | Registration destination DB | Connection Method | Data retention Data content | period |
|---|---|---|---|---|---|---|
| Communication mode A | 1 | Questionnaire Input | Consciousness code DB | Dch-PK | Consciousness code | No restriction |
|  | 2 | Questionnaire Input | Consciousness code DB | Dch-PK | Consciousness code | Real time |
|  | 3 | Character Input | Text DB | Dch-PK | EM text 20 characters | No restriction |
| Communication mode B | 1 | Video Input | Video audio DB | Bch | Still image File | Three months |
|  | 2 | Audio Input | Video audio DB | Bch | Audio File | Three months |

<table 4> shows the types of the search method of the desired consciousness information in the consciousness information reading process, and these types correspond to the content of the consciousness information as described above. In the communication mode A, a list of targets is displayed in turn during the line connection. On the other hand, in the communication mode B used for the larger capacity (amount) of data, a compressed file which is loaded down is thawed and then supplied for reading.

TALBE 4

| AP Mode |  | Message search method | Search destination DB | Connection Method | Data content | Search result |
|---|---|---|---|---|---|---|
| Communication mode A | 1 | Questionnaire Input | Consciousness code DB | Dch.PK | Consciousness code | List of targets - Successive connection |
|  | 2 | Questionnaire Input | Consciousness code DB | Dch.PK | Consciousness code | Real time |
|  | 3 | Character Input | Text DB | Dch.PK | EM text 20 characters | List of targets - Successive connection |
| Communication modeB | 1 | Video Input | Video audio DB | Bch | StiII image Fite | Down-load - Successive reading |
|  | 2 | Audio Input | VideoaudioDB | Bch | AudioFite | Down-load - Successive reading |

The communication network of the present invention aims to be used by all generations from children to the aged, and attention is also paid to an operation performance. Accordingly, the communication network is designed so that most of the operations can be performed by a mouse, a track ball or a simple key pad. Each operation is performed by successively selecting a desired item according to a frame display, and when an user carries out an erroneous operation or he falls into an operation trouble, an alarm message or an explanation message is displayed on the screen or he is guided with artificial voice. Furthermore, it is a better way to gather users who become navigators to kindly instruct the aged who are troubled with the operation.

Figure 17:
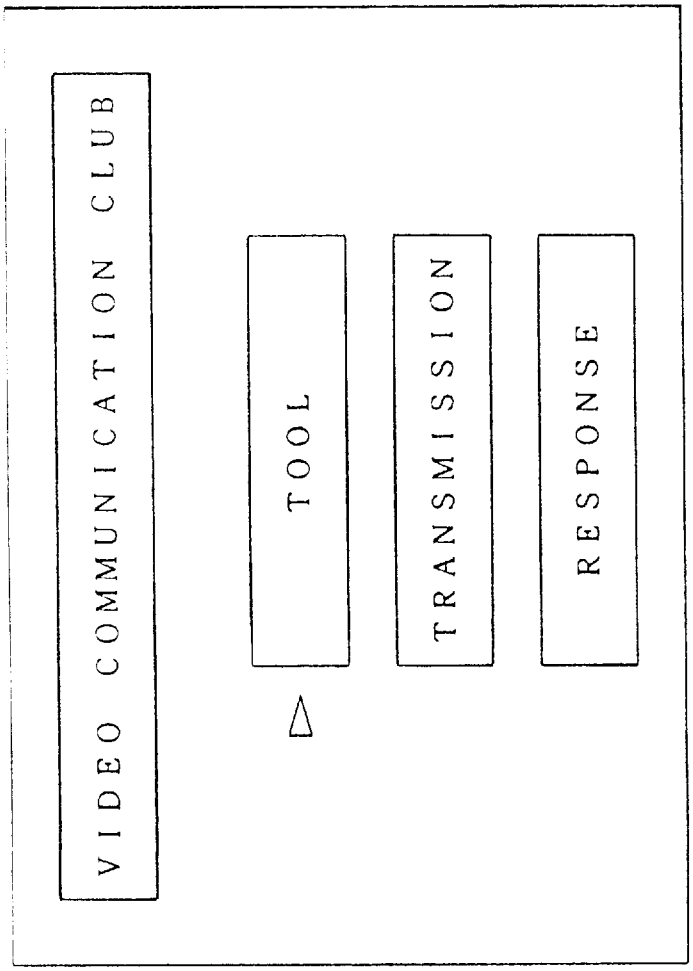
FIG. 17 is a diagram showing an example of a starting frame of "video communication club"

FIG. 17 is a diagram showing a starting frame of "video communication club" which is a service supplied from the communication network system of the present invention. This club is established so that dynamic and still pictures which are made by users can be communicated between the users or the users can enjoy dynamic and still pictures which are supplied from the host station. In order to advance a current item to a next item on the frame, it is sufficient to merely select one of "tool", "call" and "response". That is, the communication network system of the present invention is designed so that the operation content can be instinctively recognized. Here, "tool" means a tool for inputting, editing and reproducing voice, still pictures, dynamic pictures, pictures, music, documents, etc., and these tools are allowed to be started by selecting the item "tool".

In the user machine of the present invention, these tools are supplied in the form of device drivers which are called as "image front end processor", and interposed between various boards such as a VIDEO board, a voice & MIDI board, etc. installed in the user machine and the users operating these boards to automate complicated controls for these boards.

The "call" is a video data transmission mode to send (transmit) an user's intention. The "call" contains a calling which is a first inquiry to others and a calling which is a response to other's intention. Each calling contains an immediate calling and a time-lag calling.

The "response" is a reproduction mode to reproduce a response from another user which is made to the calling of the user's intention. The response may be received immediately or with a large time lag. The "response" may contain not only a response to the user's first intention, but also a response to other's opinions which are originated from the user's first intention. The main body of a series of these data are managed by each user himself, the indexes of these data are subjected to the string processing in the host machine to manage the mutual relationship between these data.

Figure 18:
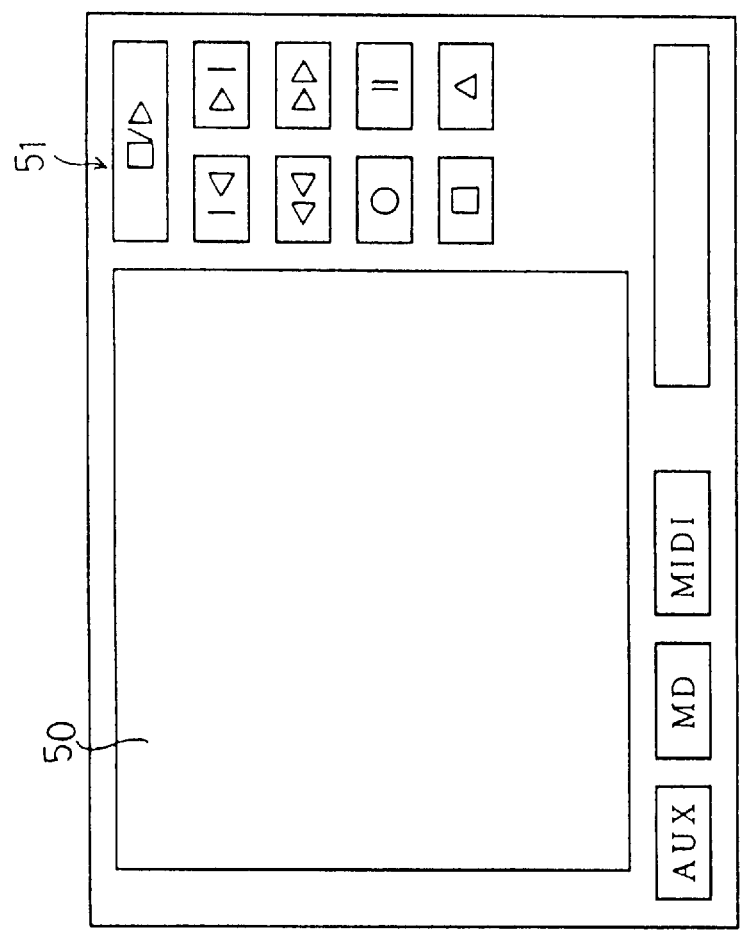
FIG. 18 is a diagram showing a reproduction operation frame of video data which is received in a "response" mode of "video communication club"

FIG. 18 shows a reproducing operation frame of video data which are received in the "response" mode.

In FIG. 18, reference numeral 50 represents a screen unit on which a reproduced image is displayed, and reference numeral 51 represents an operation unit. The operation unit 51 has substantially the same content as an operation unit of a domestic VTR, and an operation content represented by each icon is executed by clicking the icon.

Figure 19:
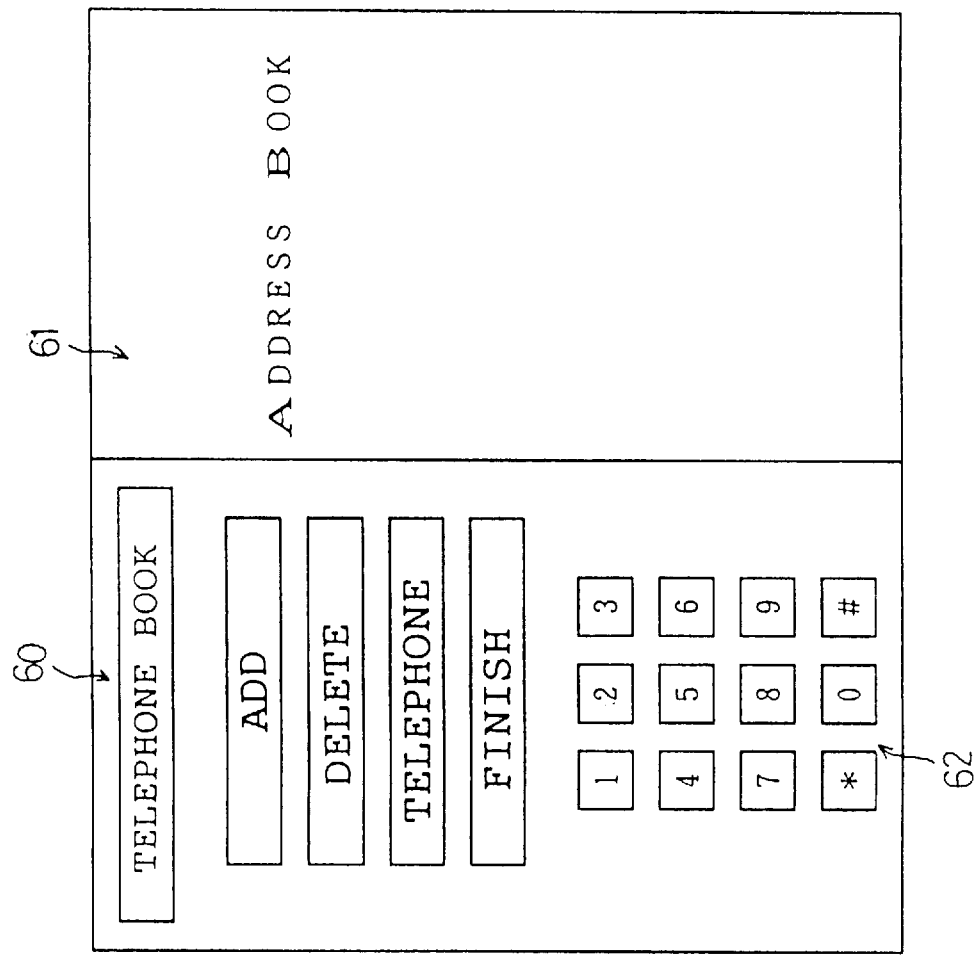
FIG. 19 is a diagram showing an example of a display frame of a TV telephone.
Figure 20:
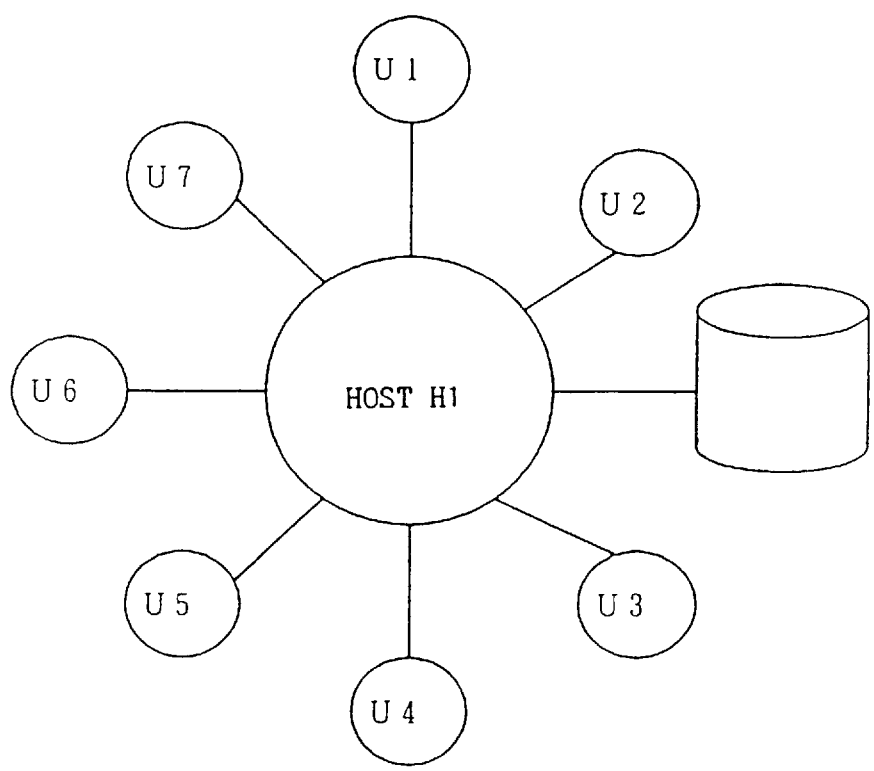
FIG. 20 is a diagram showing the basic concept of a conventional communication network system.
Figure 21:
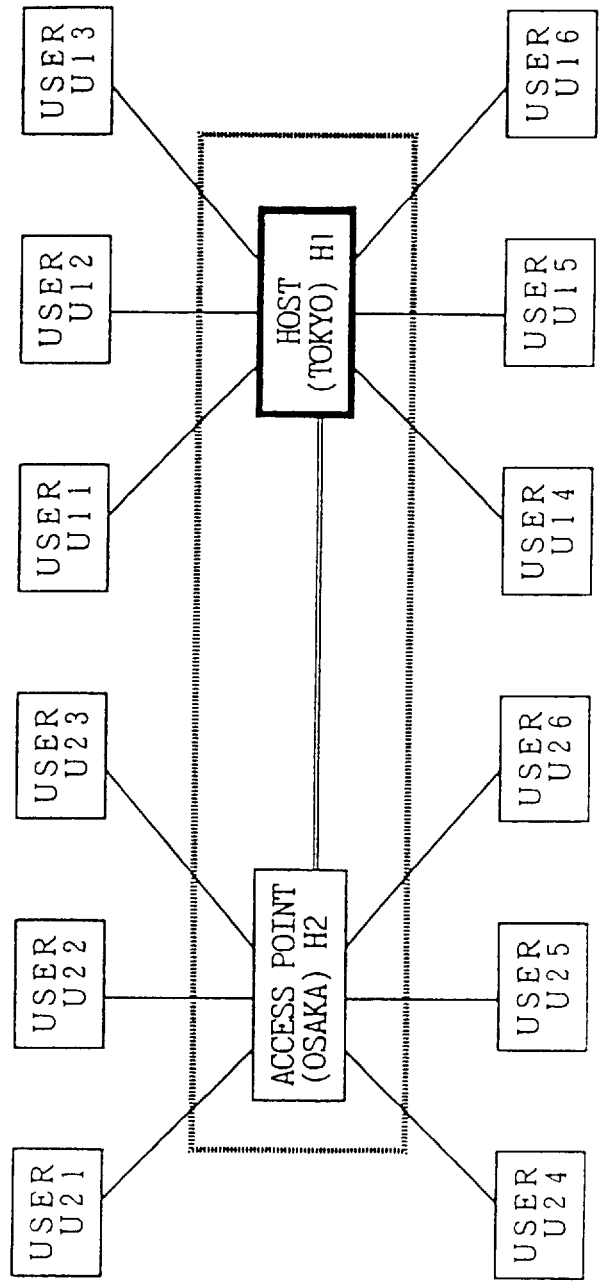
FIG. 21 is a diagram showing the concept of the conventional communication network system when an access point is disposed.

FIG. 19 shows a display frame of a TV telephone function which is another service supplied from the communication network system of the present invention. Like the "video communication club", the display frame is visualized to facilitate an operation procedure, and each item content is executed by clicking each item displayed on an operation unit 60 with a mouse operation. Furthermore, a telephone number is input by clicking a push-button unit 62 and an operation performance similar to a normal telephone is realized.

ADDRESS and BOOK 61 are provided adjacently to the operation unit 60, and addresses, names and telephone numbers of friends and acquaintances, and information on their places of employment can be displayed in the form of a list by clicking the above portion. Furthermore, an automatic dialing to a person whom the user wants to call can be performed by clicking a corresponding portion to a desired display content.

According to the communication network structure of the present invention, no knowledge information is stocked in the host station, and only the consciousness information is basically registered in the host station. The knowledge information is stocked in the user machine which is managed by each user himself. Accordingly, the knowledge information is prevented from being dominantly managed by the manager of the host station, and thus the user leading type communication network can be constructed. Furthermore, since no knowledge information is stocked in the host station, the host station may be designed in a small scale, and thus the equipment cost of the host station can be reduced.

Furthermore, according to the communication network system to which the communication network structure as described above is applied, the consciousness information which is the summary of consciousness which each user wants to transmit to other users is registered in the form of a short message, and the other users notify the host station of their intention of responding to this message so that they can meet the user on the host machine. After meeting the user on the host station, the users interrupts the communication with the host station, and directly communicates with a target user (dialogue target) through no host machine. The present invention adopts this method and uses the device construction to implement this method, so that the amount of information which can be stocked in the host machine can be remarkably increased. Accordingly, the number of users can be increased, and multimedia of information to be treated can be performed, that is, video information and audio information can be treated with a relatively small-scale host machine. The maintenance and operation cost of the host machine can be reduced, and thus charges (expenses) imposed on the users can be greatly reduced.

Since the knowledge information is directly delivered between the users through no host station, the intention of the operation manager of the host machine can be excluded at maximum, so that the information delivery can be openly performed in an user leading style.

Each user serves as a calling person of an inquiry message and also serves as a responder for other users. Therefore, unlike the conventional network system, the relationship between corporation users serving as information suppliers and general users serving as information consumers can be prevented from being fixed, and thus the information delivery can be freely and actively performed therebetween.

Abnormality in line connection, etc. which are caused in the communication network through no host station by the difference in communication protocol can be avoided by unifying the standards of the communication protocols of all the users who enter the network.

If the communication network for connecting user stations to one other and connecting each user station to the host station is an ISDN having a calling telephone number notifying function, a calling person is specified in the inter-user communication, and thus the communication rejecting right can be secured. Furthermore, by checking the conformity between the user ID number and the notified telephone number of a calling person, it can be confirmed whether the calling person is the person himself. Therefore, the credit inquiry and the settlement of accounts on the on-line shopping can be performed without error. In addition, the ISDN adopts a fee system which is little dependent on the distance between communication sides, and thus it is favorable to a long-distance communication.

Of the communication connection information of a target user which is supplied from the host station to each user, the telephone number information is kept secret to the user. Therefore, when the user machine automatically dials the target user without notifying the telephone number to the user, a mischief calling or the like due to abuse of the communication connection information can be prevented, and the privacy can be kept among the users.

When the multiple choice questionnaire system is used as the registering method of the consciousness information into the consciousness data base, and the content of the consciousness information is represented by an assembly of codes or symbols which are selected for each inquiry item, the content of the consciousness information can be easily analyzed and estimated, and the matching work can be performed rapidly. When the multiple choice questionnaire system has a tree structure, the selection items are gradually narrowed, so that a message can be easily prepared.

When the multiple choice questionnaire system is used for the registering method of the response intention content in the response intention registering process, the response intention content can be also easily analyzed and estimated.

Furthermore, when the consciousness information or the response intention which is registered in a text document format is analyzed and classified by using preset classification key words as indexes, an user who is familiar to the keyboard operation can register his intention for a short time without responding to the multiple choice questionnaire.

If in the matching work the closest corresponding relationship is set as a first candidate and the other corresponding relationships are ranked in accordance with the degree of closeness, a next candidate can be introduced to an user when a dialogue with the first candidate ends in failure.

What is claimed is:

1. A communication network structure comprising:

a plurality of user stations which are connected to one another through bidirectional communication means; and at least one host station which is connected to each of said user stations through bidirectional communication means, wherein said host station holds a data base containing consciousness information in which only each user station's intention of entering the communication network is collected, and communication connection information which is required for each user station to directly or indirectly select another user station without going through said host station to perform a direct communication therebetween, wherein the communication connection information transmitted from a host to a user is such that at least a telephone number of a target user is substantially kept to an invisible state to the user or is coded, and made meaningful or decoded in an area in said user station to which the user is untouchable, wherein each user station holds knowledge information to be delivered between said user stations without going through said host station by the direct communication therebetween, and wherein each said user station is capable of both transmitting and receiving said knowledge information.

2. The communication network structure as claimed in claim 1, wherein said communication means is a wire communication, a wireless communication or the combination communication of the wire communication and the wireless communication.

3. The communication network structure as claimed in claim 2, wherein a line used for the wire communication is a public line or an exclusively used line.

4. The communication network structure as claimed in claim 3, wherein the public line is an ISDN or an analog telephone line.

5. The communication network structure as claimed in claim 3, wherein the public line is a portable wireless telephone line or a personal handy phone line.

6. The communication network structure as claimed in claim 2, wherein the wireless communication is amateur wireless or business wireless.

7. The communication network structure as claimed in claim 1, wherein one or both of the consciousness information registered in the host station and the knowledge information stocked in each user station contain video information.

8. A communication network system including:

a plurality of user stations each having a user machine, which are connected to one another through bidirectional communication means; and at least one host station having a host machine, which is connected to each of said user stations through bidirectional communication means, wherein said user machine disposed in each user station comprises consciousness information input means for representing a user's consciousness information, which is the summary of a user's consciousness to be transmitted to another user, with one type or a combination of a plurality of types which are selected from the group consisting of picture, voice, sound, music, characters, symbols and numerals in a limited range of total information amount, and inputting the consciousness information according to a frame indication, consciousness information registering means for registering the consciousness information input from said consciousness information input means in a consciousness data base which is offered to public reading under the control of the host station, consciousness information reading means for reading consciousness information of other users which are registered in the consciousness data base, response intention registering means for expressing an intention of directly communicating with a target user who registers consciousness information to which the user concerned can respond, through the network to said host station when the user finds out the consciousness information in the consciousness data base being read, and registering a response intention into said host machine, communication connecting information recording means for receiving communication connection information on the target user, which is transmitted to a user who is judged to be proper by said host station in response to the expression of the response intention, and storing the communication connection information in a recording medium, target user automatic dialing means for connecting a bidirectional communication path with a user machine of the target user on the basis of the communication connection information stored in said communication connection information recording means, and knowledge information transmission and reception means for representing the detailed knowledge to be transmitted through the line-connected communication path with one type or a combination of a plurality of types which are selected from picture, voice, sound, music, characters, symbols and numerals, and communicating the knowledge information with the target user, wherein the communication connection information transmitted from a host to the user is such that at least a telephone number of a target user is substantially kept to an invisible state to the user or is coded, and made meaningful or decoded in an area in the user machine to which the user is untouchable, wherein each said user station is capable of both transmitting and receiving said knowledge information, and wherein said host machine disposed in said host station includes consciousness information open-public means for arranging various consciousness information of each user which is registered in the consciousness data base and opening to the public the consciousness information group through the network to all users or specific users, correspondence intention link means for performing a matching operation between consciousness information registered in the consciousness data base and the response intention content to string or group both consciousness information and response intention between which high corresponding relationship is satisfied, and communication connection information supply means for informing success of the matching to at least one of a user registering the consciousness information and a user registering the response intention when the matching succeeds, and supplying through the network the communication connection information to directly communicate with the target user.

9. A communication network system including:

a plurality of user stations each having a user machine, which are connected to one another through bidirectional communication means; and at least one host station having a host machine, which is connected to each of said user stations through bidirectional communication means, wherein said user machine disposed in each user station comprises consciousness information input means for representing a user's consciousness information, which is the summary of a user's consciousness to be transmitted to another user, with one type or a combination of a plurality of types which are selected from the group consisting of picture, voice, sound, music, characters, symbols and numerals in a limited range of total information amount, and inputting the consciousness information according to a frame indication, consciousness information registering means for registering the consciousness information input from said consciousness information input means in a consciousness data base which is offered to public reading under the control of the host station, consciousness information reading means for reading consciousness information of other users which are registered in the consciousness data base, communication connection information request means for requesting said host station through the network to supply the communication connection information to directly communicate with the target user who has registered the consciousness information concerned when the user finds out the consciousness information in the consciousness data base being read, and registering a response intention into said host machine, communication connecting information recording means for receiving the communication connection information received from said host station and recording the communication connection information in a recording medium, target user automatic dialing means for connecting a bidirectional communication path with a user machine of the target user on the basis of the communication connection information stored in said communication connection information recording means, and knowledge information transmission and reception means for representing the detailed knowledge to be transmitted through the line-connected communication path with one type or a combination of a plurality of types which are selected from picture, voice, sound, music, characters, symbols and numerals, and communicating the knowledge information with the target user, wherein the communication connection information transmitted from a host to the user is such that at least a telephone number of a target user is substantially kept to an invisible state to the user or is coded, and made meaningful or decoded in an area in the user machine to which the user is untouchable, wherein each said user station is capable of both transmitting and receiving said knowledge information, and wherein said host machine disposed in said host station includes consciousness information open-public means for arranging various consciousness information of each user which is registered in the consciousness data base and opening to the public the consciousness information group through the network to all users or specific users, and communication connection information supply means for supplying the communication connection information on the target user to the user through the network in response to the communication connection information request on the target user from the user.

10. The communication network system as claimed in claim 8 or 9, wherein the inter-use communication and the communication between each user station and the host station, when viewing from any user station, are alternatively selected.

11. The communication network system as claimed in claim 8 or 9, wherein said user machine disposed in said user station has an operation device, a display device, a storage device, a large-capacity storing medium, a communication device and a message input means, and wherein said message input means comprises a combination of at least one of an image input device, an audio input device and a character input device.

12. The communication network system as claimed in claim 8 or 9, wherein a common communication protocol is used among all user machines which enter the network.

13. The communication network system as claimed in claim 8 or 9, wherein the communication network for connecting said user stations to one another and connecting each of said user stations to said host station is an ISDN line having a calling person telephone number notifying function.

14. A communication method which is used in a communication network system comprising a plurality of user stations which are connected to one another through bidirectional communication means, and at least one host station which is connected to each of said user stations through bidirectional communication means, comprising:

a consciousness information registering step of representing a user's consciousness and what the user wants to transmit to another user, with one type or a combination of a plurality of types which are selected from the group consisting of picture, voice, sound, music, characters, symbols and numerals in a limited range of total information amount, and transmitting the consciousness information to the host station by operating a user machine and registering the consciousness information in a consciousness data base which is managed by the host station;

a consciousness information open-public step of arranging various consciousness information of respective users who are registered in the consciousness data base and opening to the public these consciousness information to all the users or specific users through a network by the host station;

a consciousness information reading step of accessing the consciousness data base through an operation of a user machine by a user to read consciousness information of other users which are registered in the consciousness data base;

a response intention registering step of expressing an intention of directly communicating with another user who registers consciousness information to which the user concerned can respond, through the network to the host station when the user finds the consciousness information in the read consciousness data base, and registering the response intention into the host machine;

a correspondence intention link step of performing a matching operation between consciousness information registered in the consciousness data base and the response intention content by the host station to string or group both consciousness information and response intention between which high corresponding relationship is satisfied;

a communication connection information supply step of informing at least one of a user registering the consciousness information and a user registering the response intention of a matching success when an intention link succeeds in the correspondence intention link process, and supplying the communication connection information from the host station through the network to directly communicate with a user at the other user who is a target user; and an inter-user communication step of setting a bidirectional communication path with a user machine of the target user to a line connection state in accordance with the communication connection information obtained from the host station in the communication connection information supply step by operating the user machine, and representing detailed knowledge to be transmitted between both the users through the line-connected communication path with one type or a combination of a plurality of types which are selected from the group consisting of picture, voice, sound, music, characters, symbols and numerals, thereby mutually transmitting the knowledge information by operating the user machines, wherein the communication connection information transmitted from a host to the user is such that at least a telephone number of a target user is substantially kept to an invisible state to the user or is coded, and made meaningful or decoded in an area in the user machine to which the user is untouchable, and wherein each said user station is capable of both transmitting and receiving said knowledge information.

15. A communication method which is used in a communication network system comprising a plurality of user stations which are connected to one another through bidirectional communication means, and at least one host station which is connected to each of said user stations through bidirectional communication means, comprising:

a consciousness information registering step of representing a user's consciousness and what the user wants to transmit to another user, with one type or a combination of a plurality of types which are selected from the group consisting of picture, voice, sound, music, characters, symbols and numerals in a limited range of total information amount, and transmitting the consciousness information to the host station by operating a user machine and registering the consciousness information in a consciousness data base which is managed by the host station;

a consciousness information open-public step of arranging various consciousness information of respective users who are registered in the consciousness data base and opening to the public these consciousness information to all the users or specific users through a network by the host station;

a consciousness information reading step of accessing the consciousness data base through an operation of a user machine by a user to read consciousness information of other users which are registered in the consciousness data base;

a communication connection information request step of requesting to the host station communication connection information to directly communicate with a target user who registers consciousness information to which the user can respond when the user finds the consciousness information in the consciousness data base being read;

a communication connection information supply step of notifying the communication connection information on the target user from the host station through the network to the user in response to the communication connection information request on the target user which is made by the user; and an inter-user communication step of setting a bidirectional communication path with a user machine of the target user to a line connection state in accordance with the communication connection information obtained from the host station in the communication connection information supply step by operating the user machine, and representing detailed knowledge to be transmitted between both the users through the line-connected communication path with one type or a combination of a plurality of types which are selected from the group consisting of picture, voice, sound, music, characters, symbols and numerals, thereby mutually transmitting the knowledge information by operating the user machines, wherein the communication connection information transmitted from a host to the user is such that at least a telephone number of a target user is substantially kept to an invisible state to the user or is coded, and made meaningful or decoded in an area in the user machine to which the user is untouchable, and wherein each said user station is capable of both transmitting and receiving said knowledge information.

16. The communication method as claimed in claim 14 or 15, wherein a multiple choice questionnaire system of selecting one response from matters which are previously prepared is adopted as a method of registering the consciousness information into the consciousness data base, and the content of registered consciousness information comprises an assembly of codes or numeral values which are selected in correspondence to each question matter.

17. The communication method as claimed in claim 14 or 15, wherein a multiple choice questionnaire system of selecting one response from matters which are previously prepared is adopted as a method of registering the response intention content into the consciousness data base in said response intention registering step, and the content of registered response intention comprises an assembly of codes or numeral values which are selected in correspondence to each question matter.

18. The communication method as claimed in claim 16, wherein said questionnaire system has a tree structure.

19. The communication method as claimed in claim 14 or 15, wherein both of each consciousness information registered in the consciousness data base and the response intention content registered in said response intention registering step are registered in a text document format, and the matching work of the host station is performed with preset classification key words as indices.

20. The communication method as claimed in claim 14 or 15, wherein in the matching work of the host station, the closest corresponding relationship is set as a first candidate, and other corresponding relationships are ranked in accordance with the degree of closeness.

* * * * *